(12) United States Patent
Smith et al.

(10) Patent No.: US 8,720,104 B2
(45) Date of Patent: May 13, 2014

(54) CUSTOMIZABLE FISHING LURE SYSTEM AND ACCOMPANYING APPARATUS

(76) Inventors: Scott Edward Smith, Cincinnati, OH (US); Jack Lee Oney, Jr., Mason, OH (US)

( * ) Notice: Subject to any disclaimer, the term of this patent is extended or adjusted under 35 U.S.C. 154(b) by 383 days.

(21) Appl. No.: 13/199,272

(22) Filed: Aug. 24, 2011

(65) Prior Publication Data
US 2013/0205643 A1    Aug. 15, 2013

Related U.S. Application Data

(63) Continuation-in-part of application No. 12/075,819, filed on Mar. 13, 2008, now Pat. No. 8,028,464.

(51) Int. Cl.
*A01K 97/04* (2006.01)

(52) U.S. Cl.
USPC ........................................... 43/42.22

(58) Field of Classification Search
USPC ............................ 43/42.22, 42.27
See application file for complete search history.

(56) References Cited

U.S. PATENT DOCUMENTS

| | | | | |
|---|---|---|---|---|
| 2,494,384 A * | 1/1950 | Gadzinski et al. | ........... | 43/42.22 |
| 4,215,507 A * | 8/1980 | Russell | ........... | 43/42.22 |
| 4,944,112 A * | 7/1990 | Garmany et al. | ........... | 43/42.09 |
| 5,331,762 A * | 7/1994 | Banks | ........... | 43/42.09 |
| 5,351,433 A * | 10/1994 | Ellis | ........... | 43/42.22 |
| 5,566,496 A * | 10/1996 | Rutherford et al. | ........... | 43/42.09 |
| 5,992,083 A * | 11/1999 | Deng et al. | ........... | 43/42.15 |
| 6,079,145 A * | 6/2000 | Barringer | ........... | 43/42.06 |
| 6,101,758 A * | 8/2000 | Finley | ........... | 43/42.22 |
| 6,804,910 B1 * | 10/2004 | Sharp | ........... | 43/42.22 |
| 7,316,095 B1 * | 1/2008 | Petner et al. | ........... | 43/42.22 |
| 8,028,463 B2 * | 10/2011 | Watson | ........... | 43/21.2 |

* cited by examiner

*Primary Examiner* — Christopher P Ellis

(57) ABSTRACT

A customized fishing lure system having a lip and a body. The lip being adapted to provide resistance when said fishing lure is moved within water. The body having a keyway adapted to receive, engage and lock the lip. The lip being adapted to releasably engage with the body without the need of another structural element or hand-tool. The lip further having a stem portion and a protrusion portion being adapted to releasably engage within the keyway. The lip is not capable of being releasably disengaged from the body by merely apply a longitudinal tensile force to the lip. The lip is releasably engaged within the keyway by applying a rotational force no greater than 360 degrees.

8 Claims, 30 Drawing Sheets

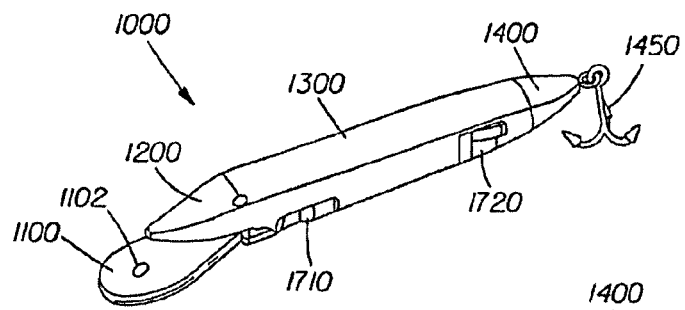
Fig. 1A
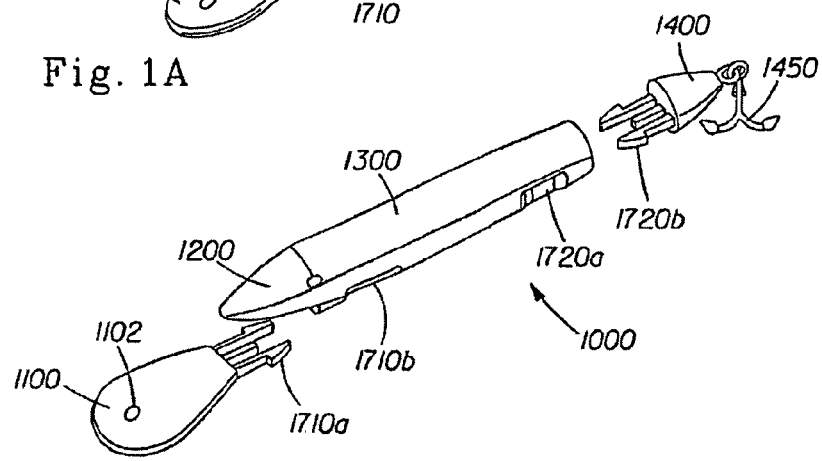
Fig. 1B
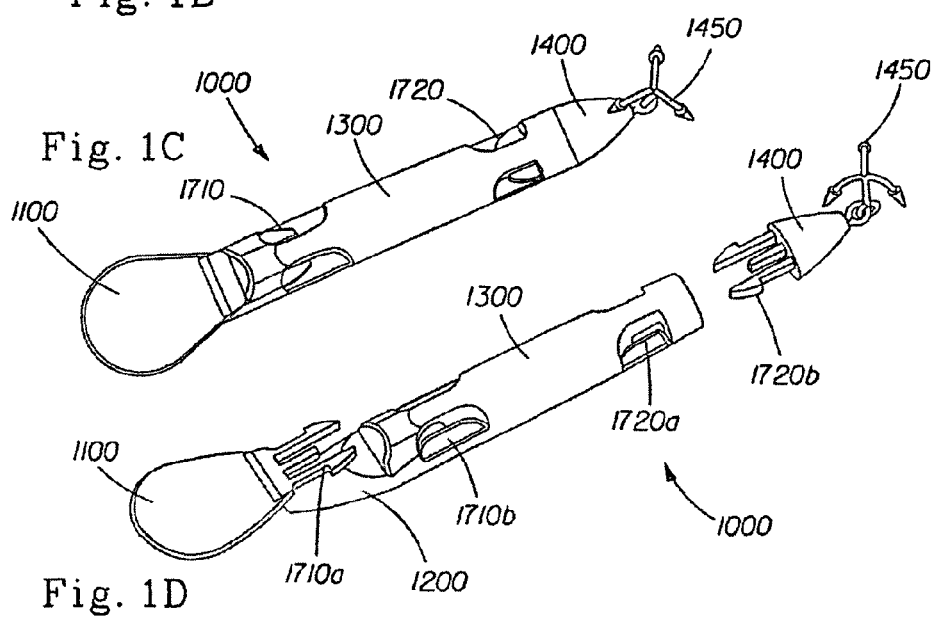
Fig. 1C
Fig. 1D

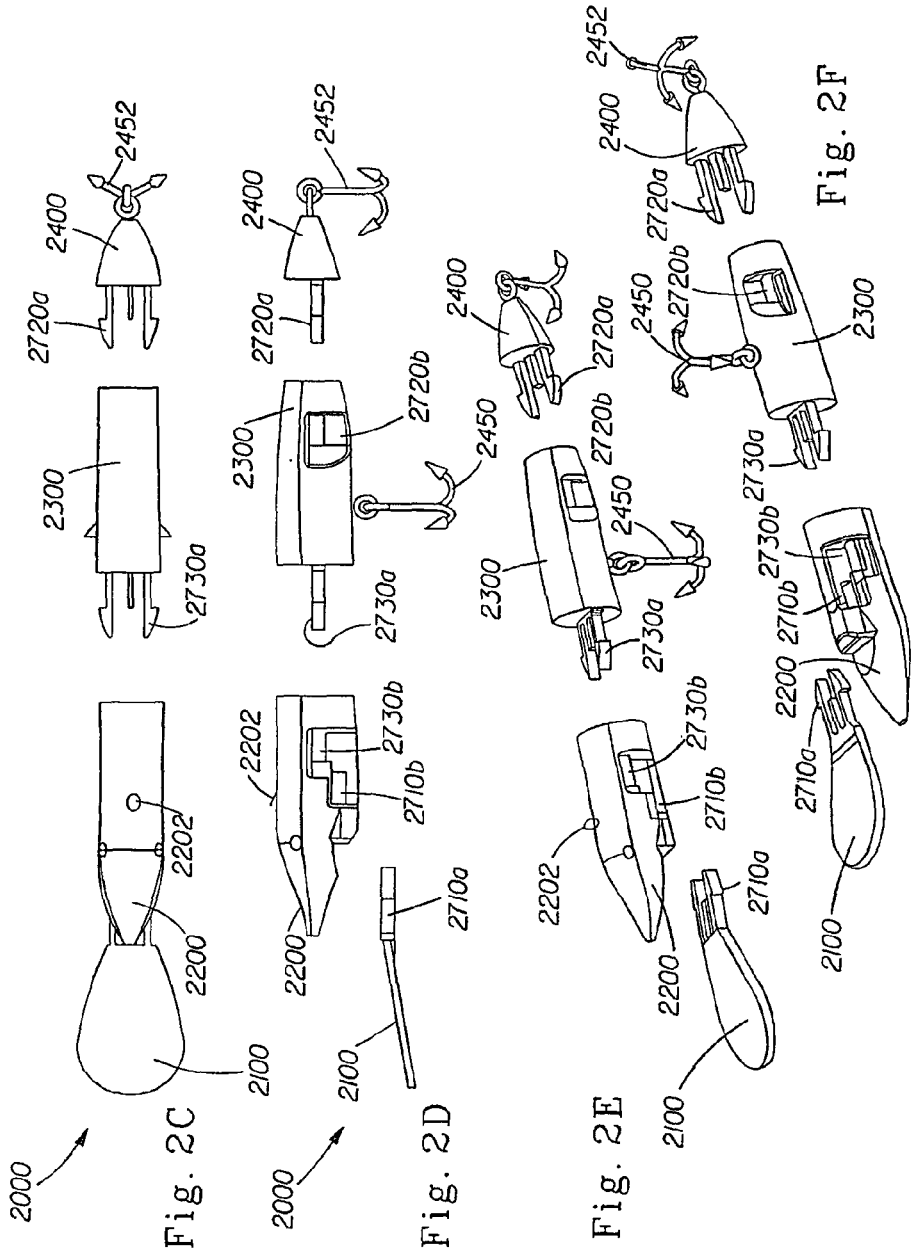

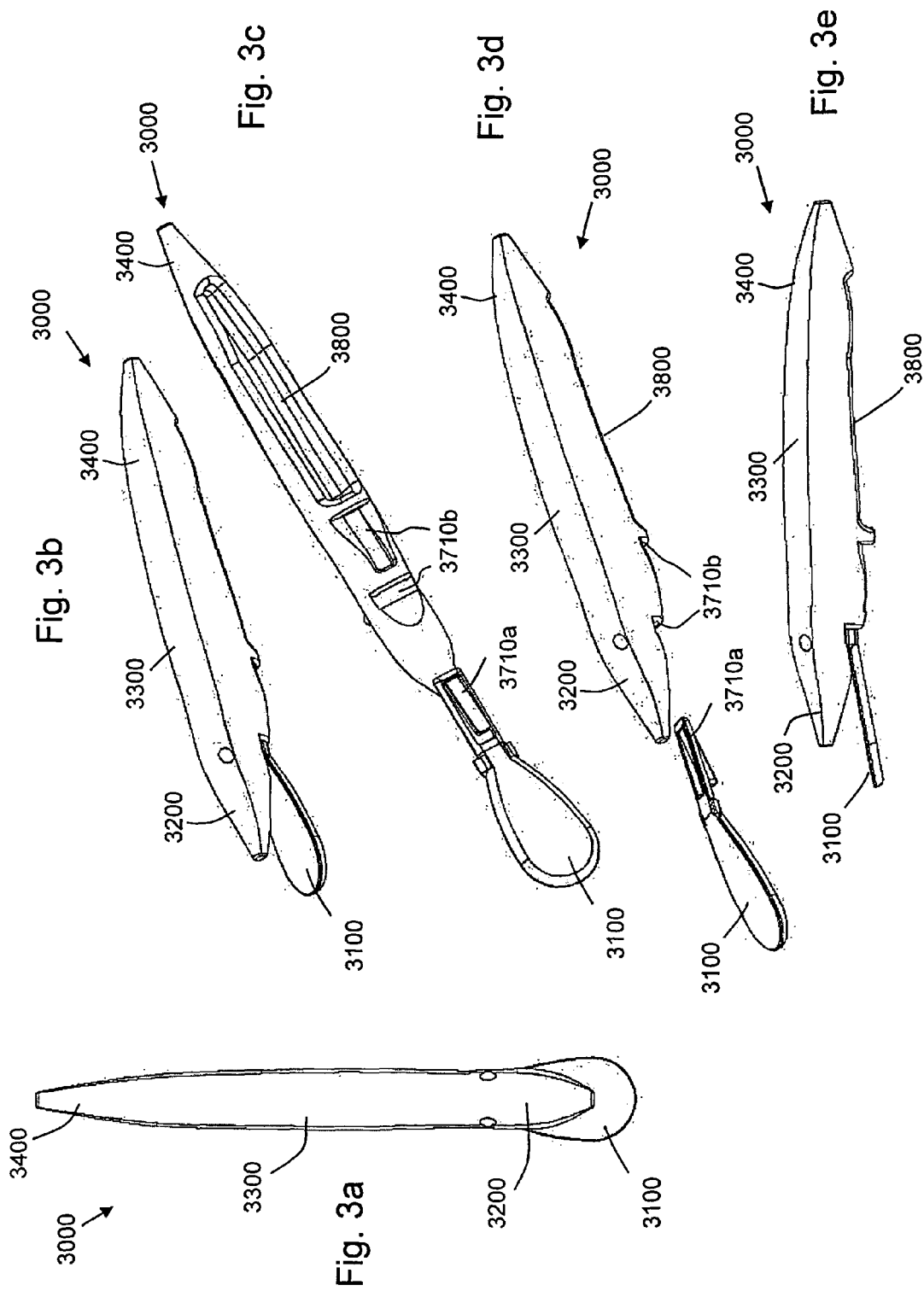

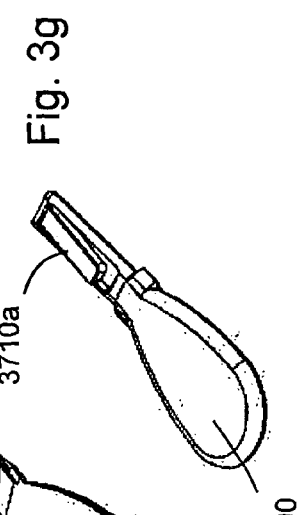
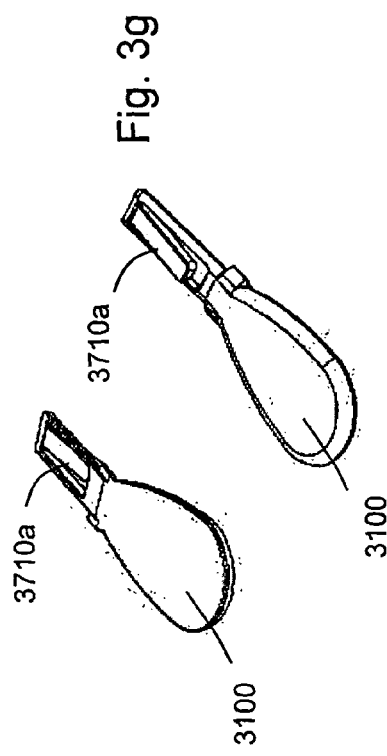
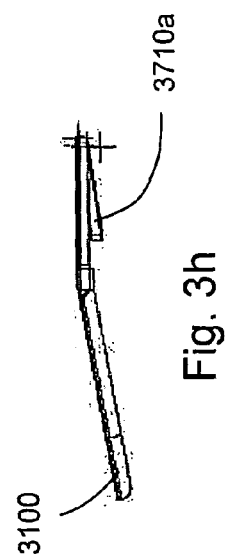
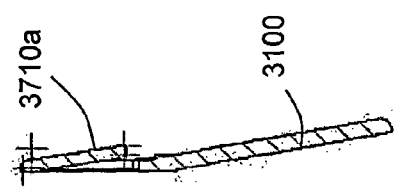
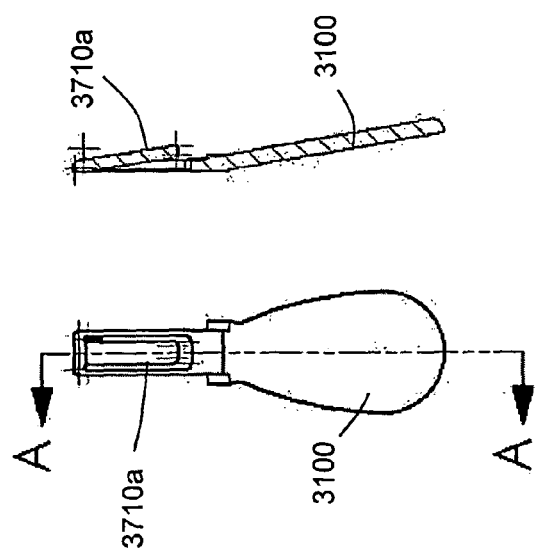
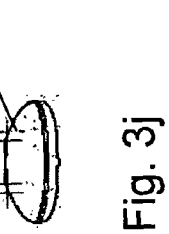

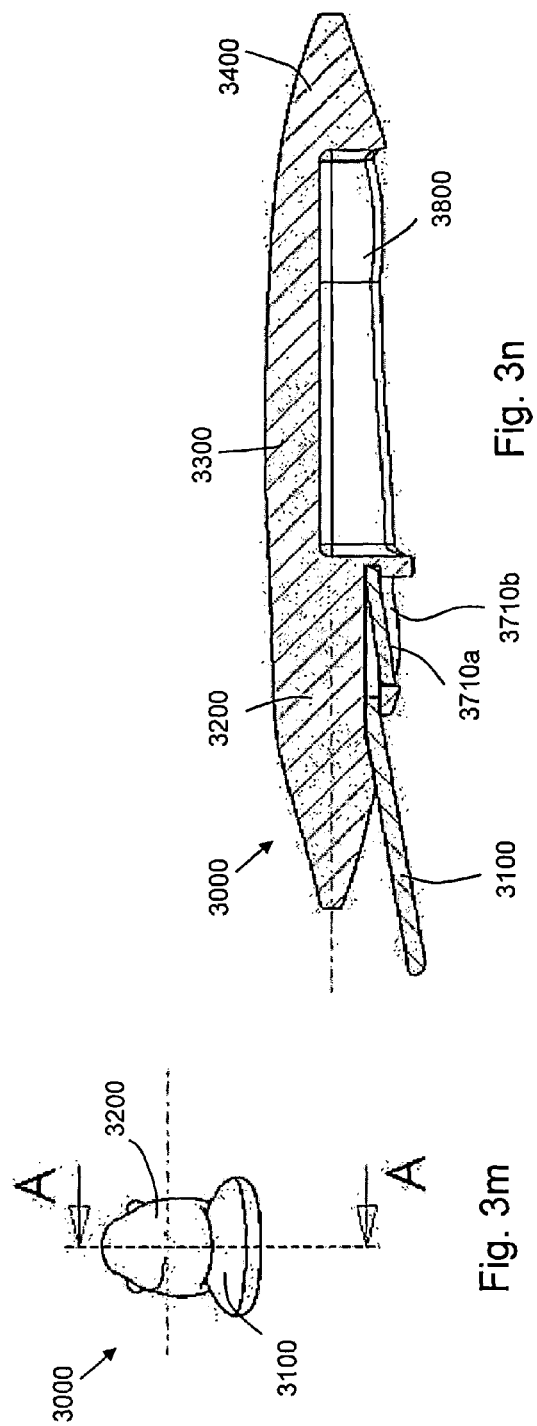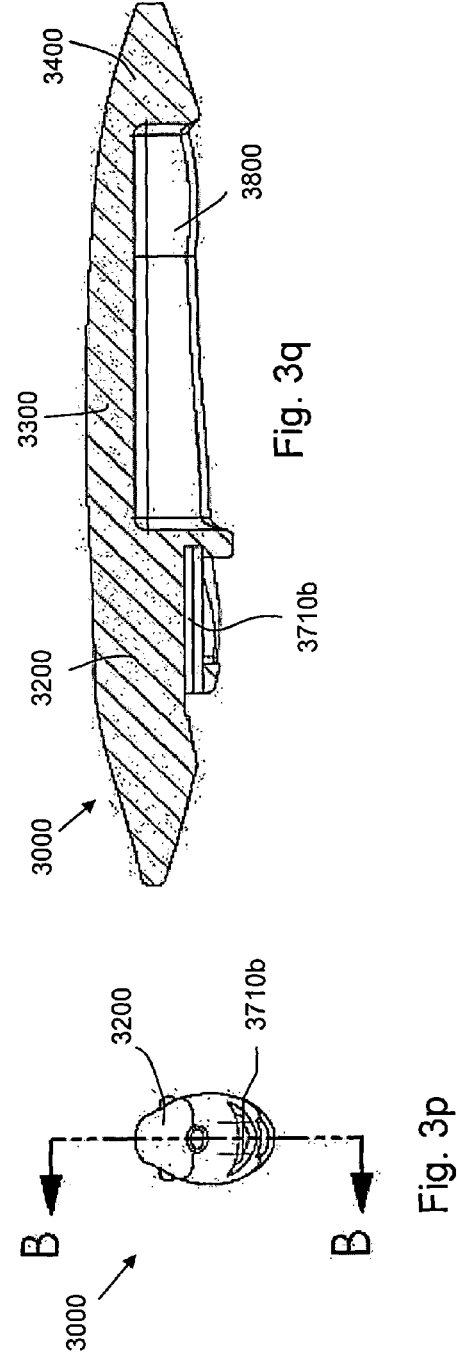

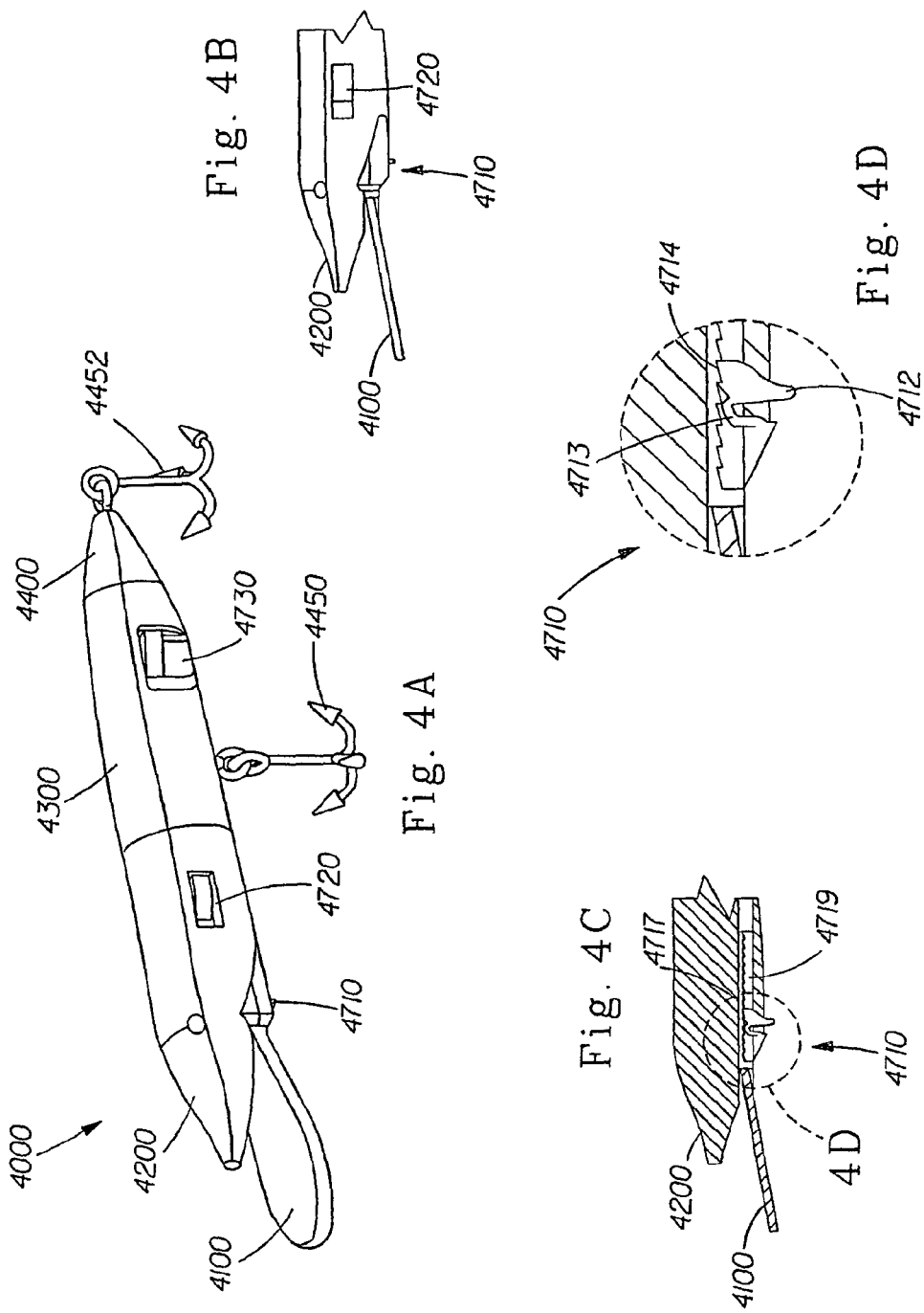

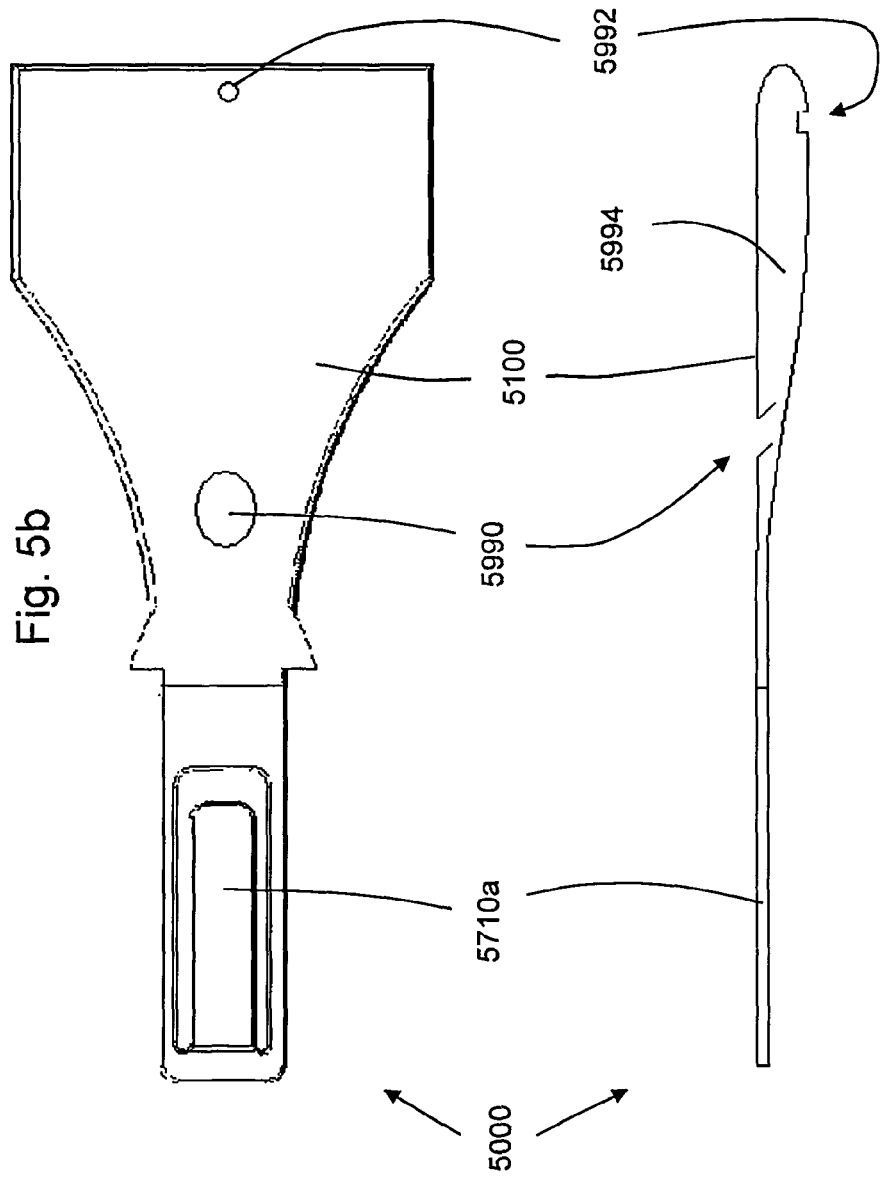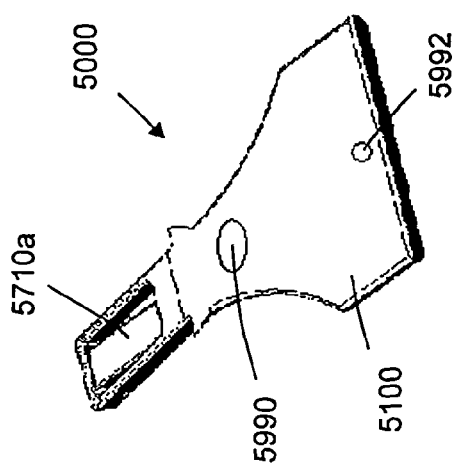

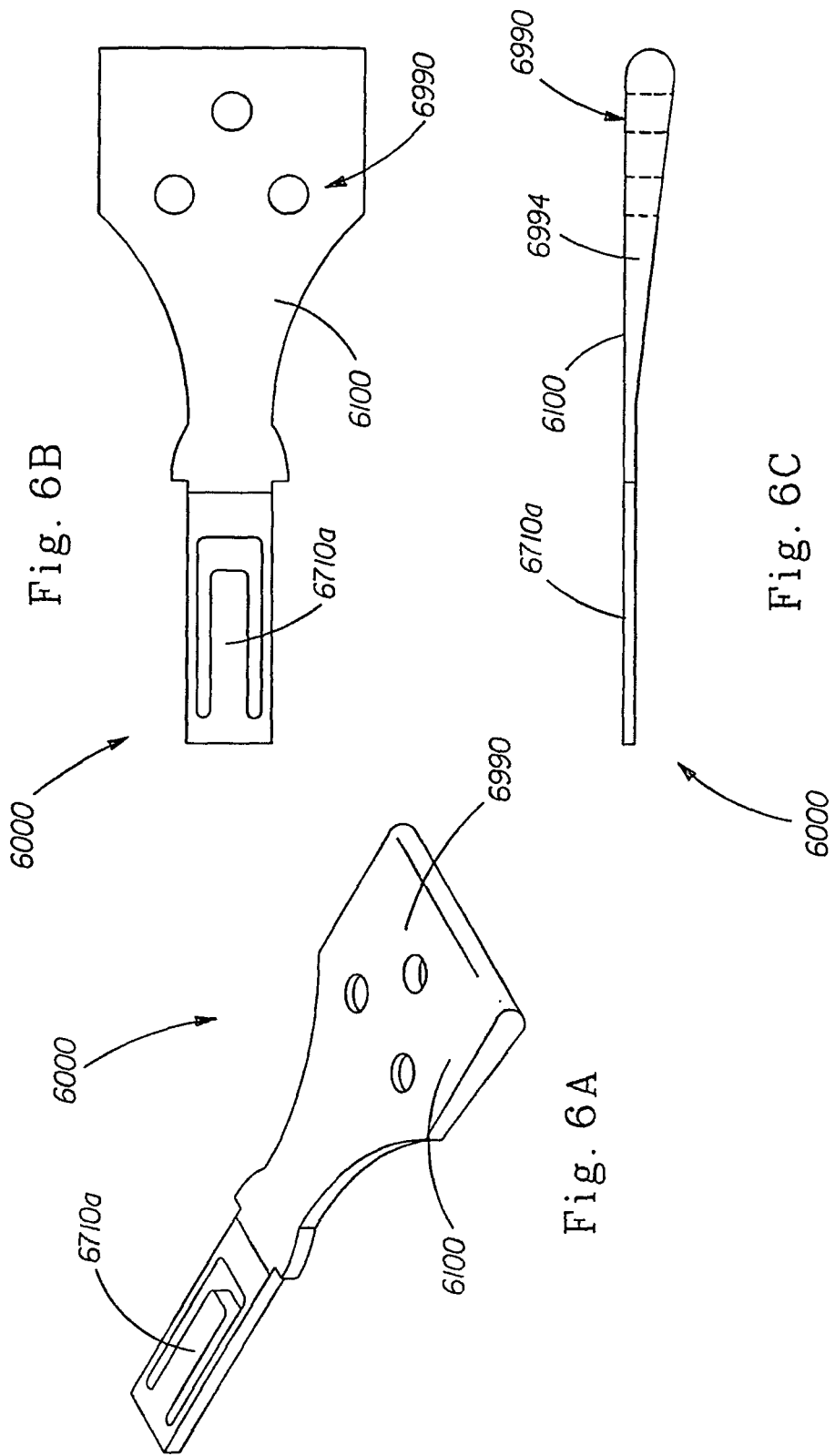

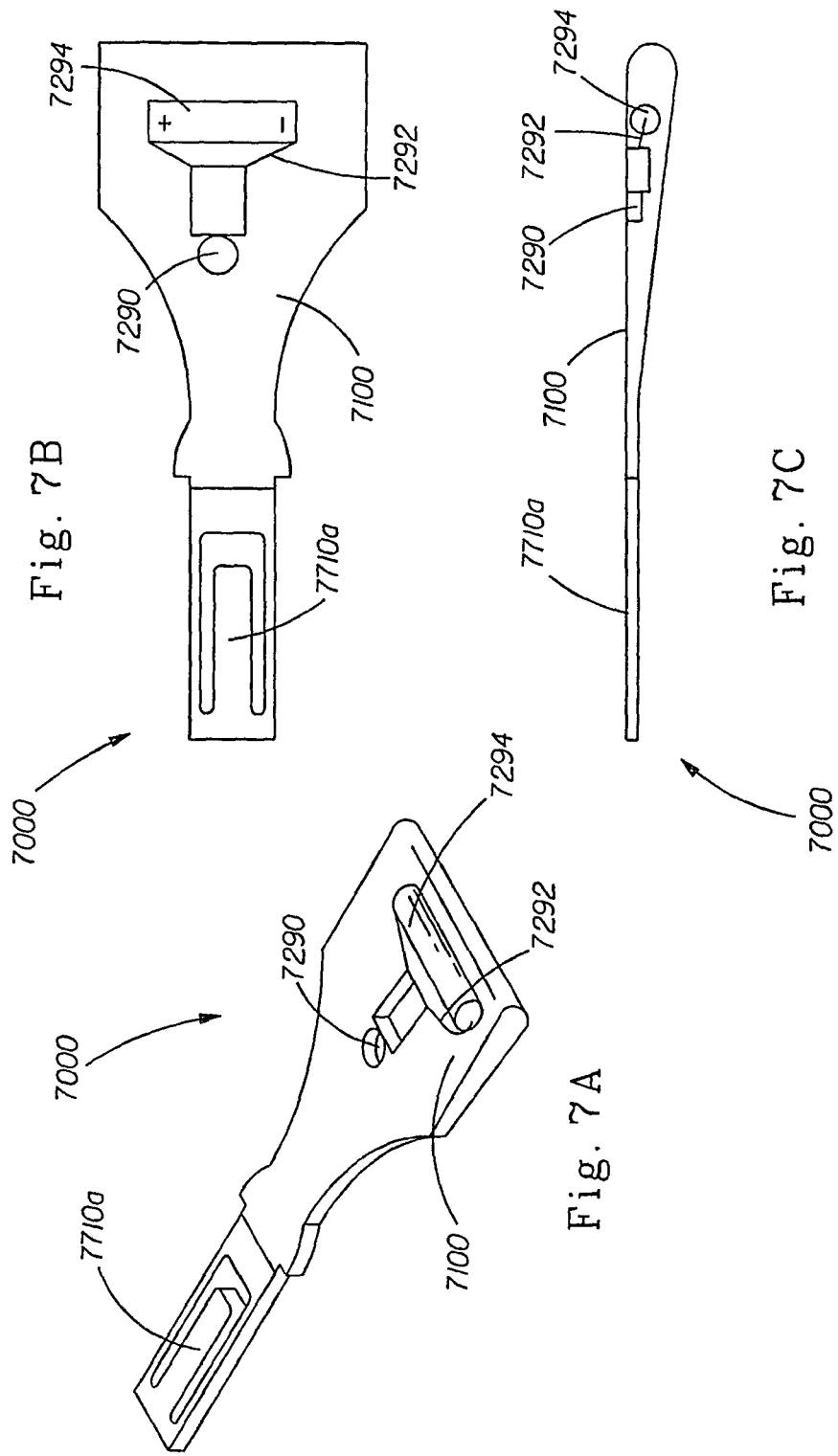

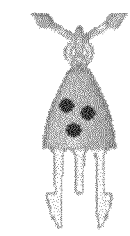
Fig. 13a
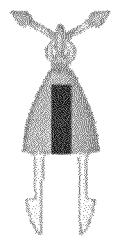
Fig. 13b
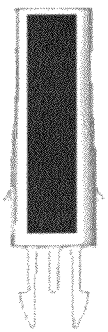
Fig. 13c

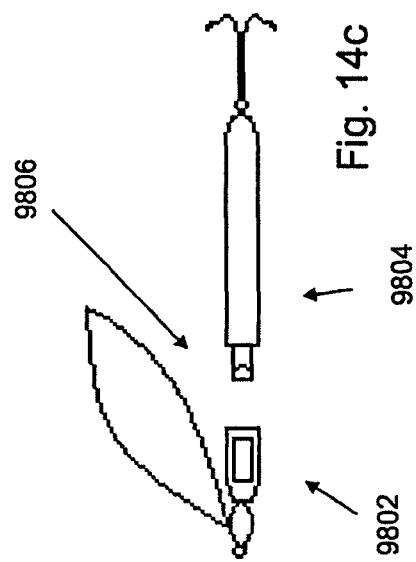
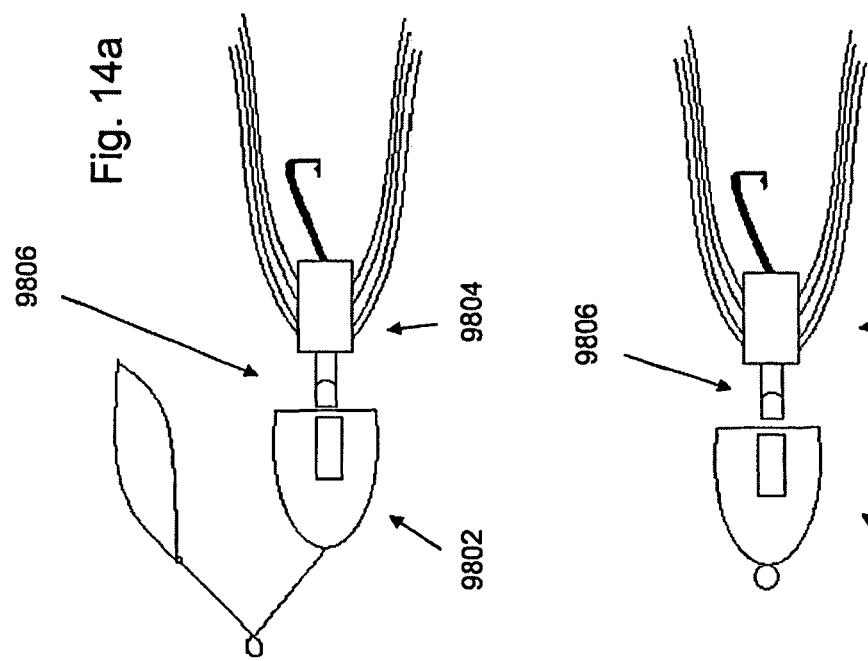

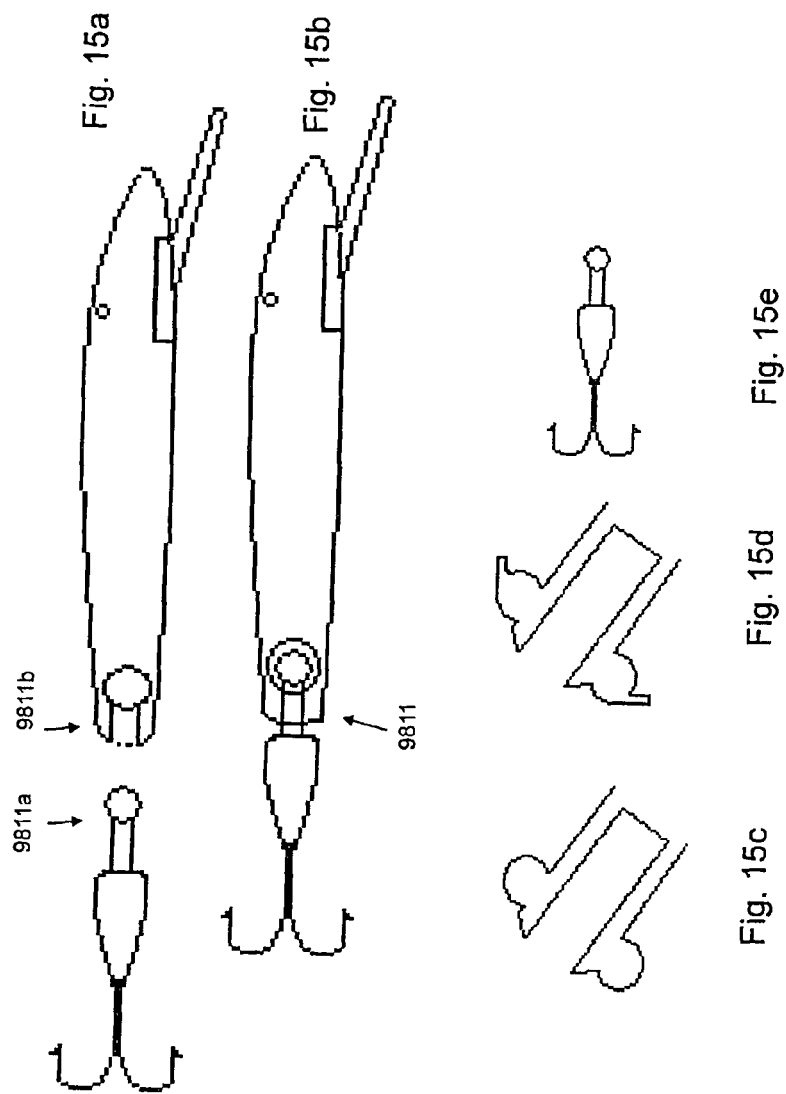

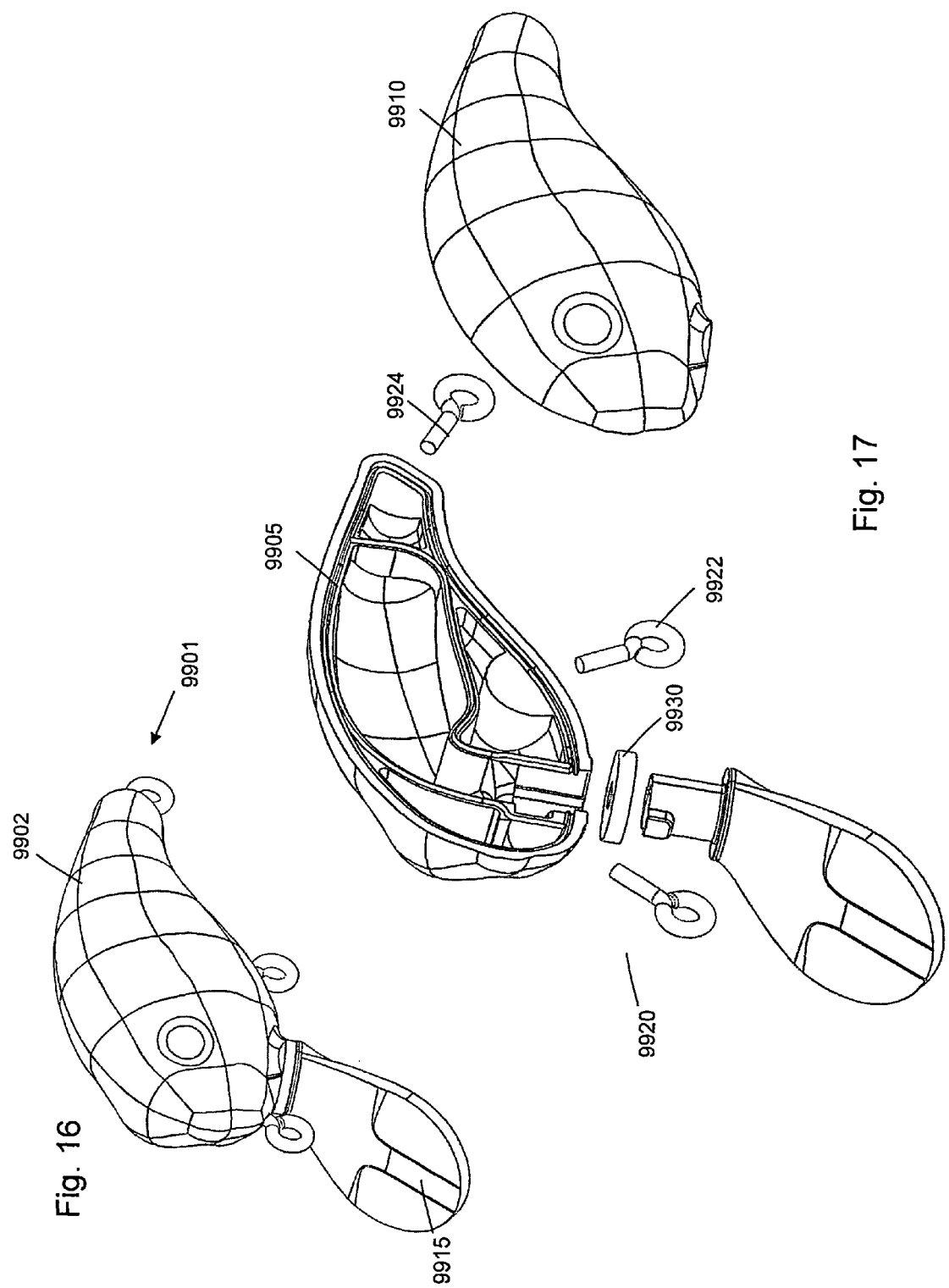

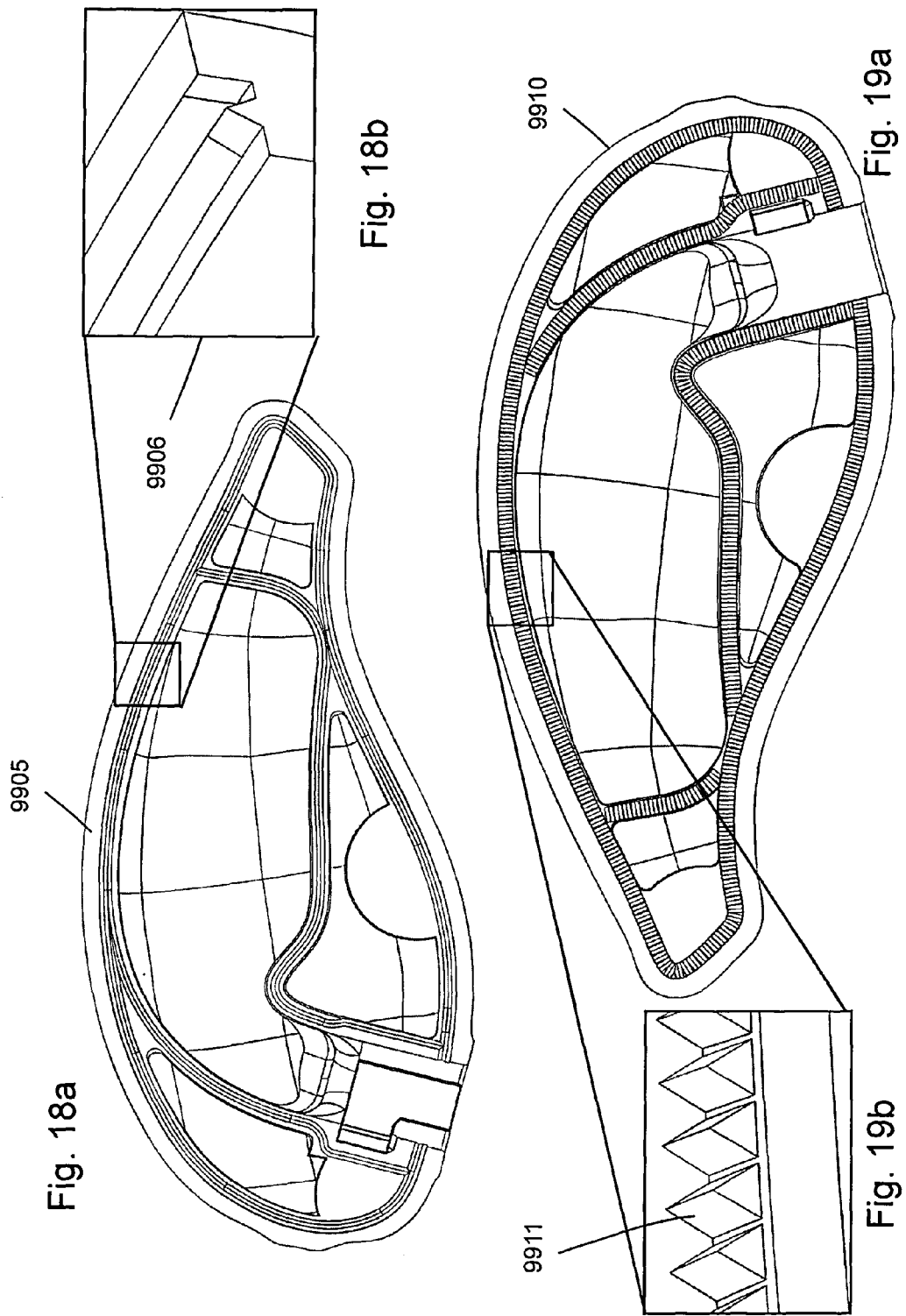

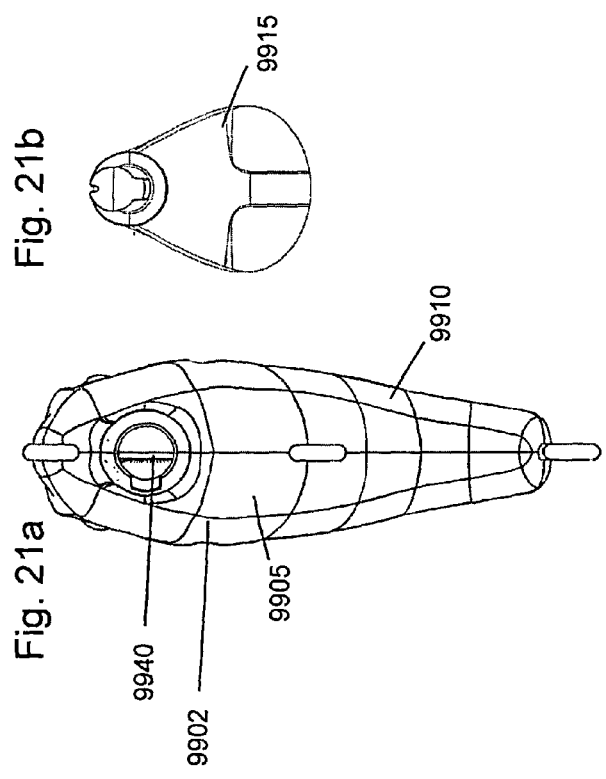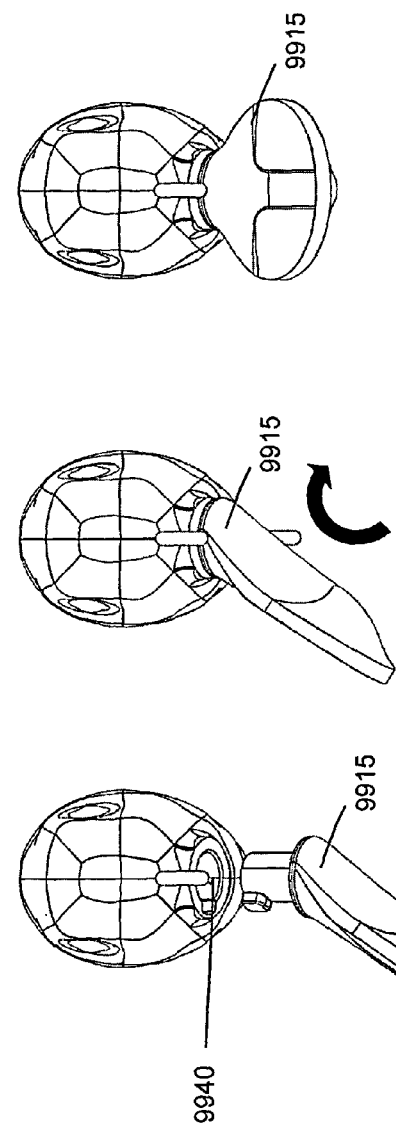

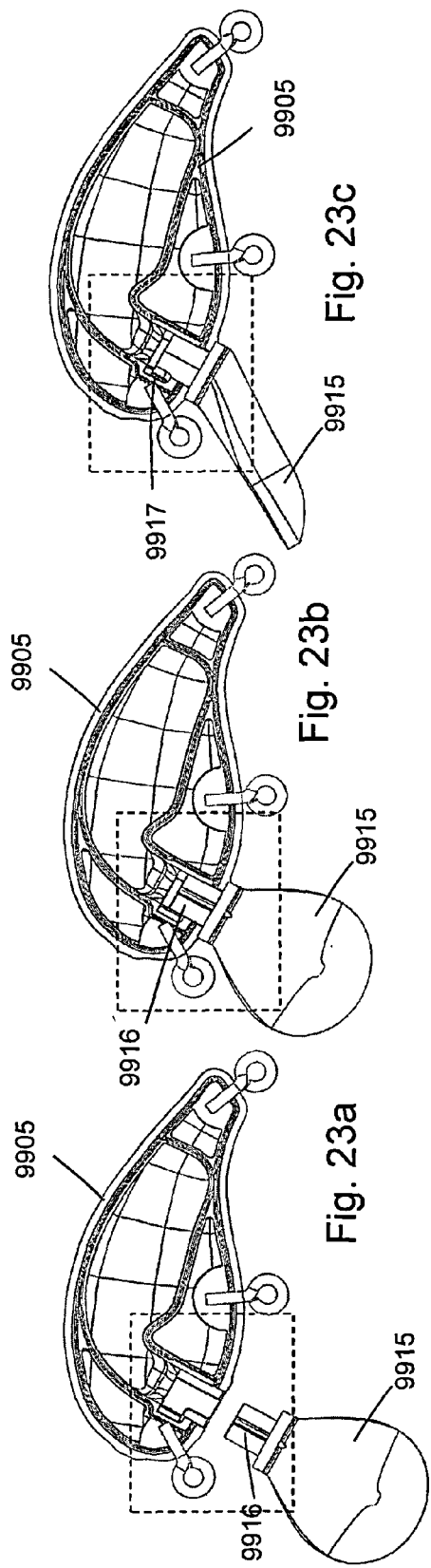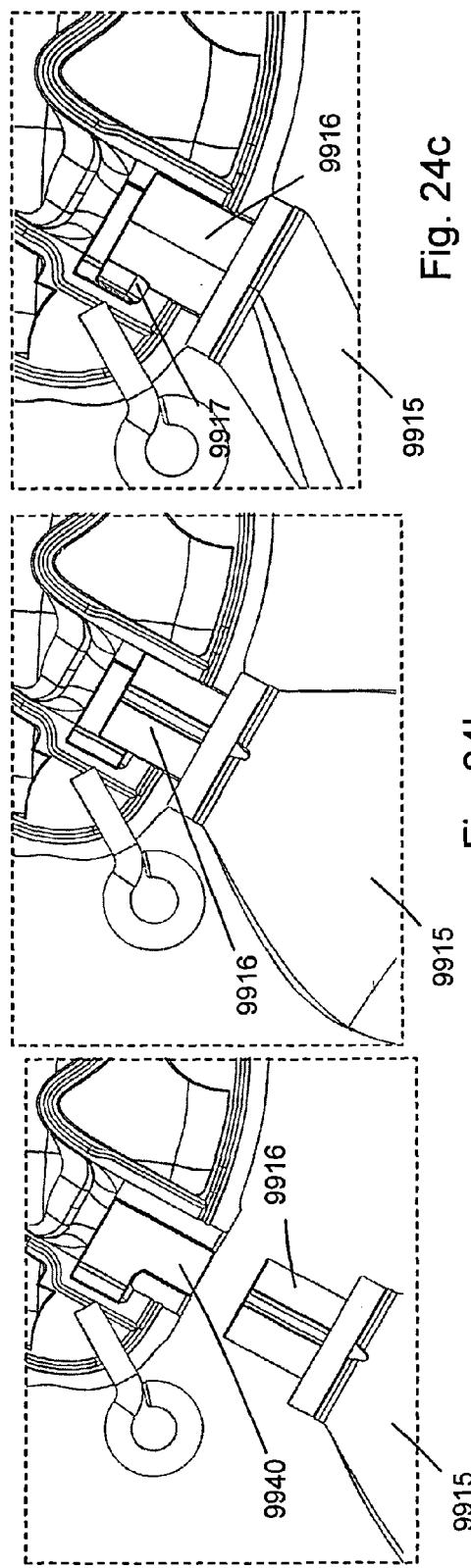

CUSTOMIZABLE FISHING LURE SYSTEM AND ACCOMPANYING APPARATUS

CROSS REFERENCE TO RELATED APPLICATION

This application is a continuation-in-part and claims benefit to U.S. application Ser. No. 12/075,819 which was filed on Mar. 13, 2008 now U.S. Pat. No. 8,028,464.

FIELD OF THE INVENTION

This invention relates to a customizable fishing lure system and accompanying apparatus. More specifically, this invention relates to a fishing lure system that allows one to construct a variety of fishing lures dependent on the immediate need. Further, such customized fishing lure system provides unique marketing and point-of-sale opportunities.

BACKGROUND OF THE INVENTION

The sport of fishing requires a unique balance of art, science and luck. And while luck will always play a role, advancements in art and science will increase the odds that fish will be caught. Accordingly, manufacturers have designed many different color and shaped fishing lures to provide a wide variety of artistically-pleasing options. As a result, the consumer is bombarded and confused by a barrage of hundreds of lures, each touting their superior design. Consequently, consumers often buy a sampling of a dozen or more different lures and then fill their over-sized tacklebox with an uncertain confidence that they've made the right decisions.

So now on the water, the consumer/angler undoubtedly will convince himself that the blue-colored, large-sized, medium-lip, rattling lure is the right choice. And perhaps he will even catch a fish or two with it. But then comes the inevitable . . . the lure gets damaged or lost. Then what? All the remaining blue lures in his box are small in size and have small lips; as such, they won't dive deep enough to get to where the fish are. And all his rattling lures are either yellow or orange. What to do?

What is needed is a customizable fishing lure system that allows the angler to construct or repair a customizable lure under real-time conditions in such a manner that provides flexibility and versatility.

What is further needed is a customizable fishing lure system that allows a manufacturer to uniquely market and a consumer to easily select a combination of nearly unlimited options. Such a customizable fishing lure system should reduce necessary shelf-space for the manufacturer/retailer and tacklebox-space for the consumer. Additionally, such a customizable fishing lure system and accompanying marketing approaches/displays prove a unique and satisfying shopping experience that results in a greater confidence and less personal reliance on luck.

SUMMARY OF THE INVENTION

A fishing lure having a lip, leading portion, trailing portion, body portion, a hook and connection mechanism. The lip being adapted to provide resistance when said fishing lure is moved within water. The leading portion being positioned towards the leading portion of said fishing lure. The trailing portion being positioned towards the trailing portion of said fishing lure. The body portion being positioned between said leading portion and said trailing portion. The hook being attached to said fishing lure. The first connection mechanism adapted to releasably engage said lip to said leading portion. The lure may include a second connection mechanism adapted to releasably engage said trailing portion to said body portion. The lure may include a third connection mechanism adapted to releasably engage said leading portion to said body portion. The hook may be adapted to be releasably engaged to the fishing lure. The lure may include a cavity portion (also referred to herein as a reservoir) adapted to house at least one characteristic-producing element.

A fishing lure having a lip, a leading portion, a trailing portion, a body portion and a hook. The lip being adapted to provide resistance when said fishing lure is moved within water. The leading portion being positioned towards the leading portion of said fishing lure. The trailing portion being positioned towards the trailing portion of said fishing lure. The body portion being positioned between said leading portion and said trailing portion. The hook being attached to said fishing lure. The lip may be adapted to be moved inwardly and outwardly from said leading portion in such a manner so as to change the amount of surface area exposed externally which may alter the movement properties of said fishing lure. The lure may include a lever which may be actuated to cause a stop to engage or disengage a first engaging surface so as to permit or inhibit the movement of said lip.

A lip for use with a fishing lure having a ruder portion and a locking portion. The ruder portion being adapted to provide resistance when the fishing lure is moved within water. The locking portion being releasably engageable to a mating portion within the fishing lure. The lip may include a reservoir inlet, a reservoir and a reservoir outlet wherein a substance may be introduced through reservoir inlet for temporary storage within said reservoir and ultimate dispensing through said reservoir outlet for dissemination into the water for attracting fish. The lip may include a reservoir and at least one reservoir elements, wherein said reservoir elements provide altering properties of said lip. The reservoir elements may be selected from a group consisting of weights, glass beads, ceramic balls, plastic pellets and any combinations thereof. The lip may include an illumination element. The lip may include a fracture section adapted to allow a front portion of said ruder portion to be broken away. The lip may include a pivoting section adapted to allow a front portion of said ruder portion to be pivoted. The lip may include ruder portion which is non-linear. The ruder portion may be substantially flat and plug-shaped so as to plug the otherwise opening within the fishing lure in such a way to provide a lip with minimal exposure. The lip may be adapted to cause the fishing lure to be retracted in a non-linear path. The lip may include a first lip portion and a second lip portion, wherein the first lip is adapted to increase drag as compared to the drag imparted on the second lip portion.

A fishing lure having a connection mechanism which is substantially covered by a connection cover. The connection cover may be made to appear as fish-like features. The connection cover may be made to extend beyond the perimeter of the fishing lure so as to appear as fins or the like.

A fishing lure having a lip, leading portion, trailing portion, body portion, hook and a connection mechanism. The lip being adapted to provide resistance when said fishing lure is moved within water. The leading portion being positioned towards the leading portion of said fishing lure. The trailing portion being positioned towards the trailing portion of said fishing lure. The body portion being positioned between said leading portion and said trailing portion. The hook being attached to said fishing lure. The first connection mechanism adapted to releasably engage said lip to said body portion.

A fishing lure system having at least one fishing lure, at least one lip and a package for substantially containing the lure and the lip. The system may also include a communication which describes at least one recommendation for combining said fishing lure and said lip for targeted fishing. The system may include a plurality of said fishing lures and a plurality of recommendations for targeted fishing. The plurality of said fishing lures may contain at least two different types of fishing lures. The fishing lure system having a plurality of lips and a plurality of recommendations for targeted fishing. The fishing lure system having a plurality of lips which contains at least two different types of lips.

A fishing lure system having a fishing lure having an extendable lip and a package. The package may be adapted to substantially contain the fishing lure, wherein the package may be adapted to allow the extendable lip to be moved at a point-of-sale. The package may include a backpanel and a package cover, wherein the backpanel and the package cover together substantially encapsulates the fishing lure, wherein the package cover includes an opening such that the extendable lip may be extended and/or retracted therethrough at a point-of-sale.

A fishing lure retail display having a panel, at least one fishing lure; at least one extendable lure tether, wherein the lure tether is attached to the panel and the lure therebetween; at least one lip; at least one extendable lip tether; wherein the lip tether is attached to the panel and the lip therebetween; and a communication which describes at least one recommendation for combining the fishing lure and lip for targeted fishing.

A fishing product recommendation system having a user interface. The user interface having communication which is directed at acquiring fishing related information and upon collection of the information providing a fishing product recommendation for targeted fishing. The fishing product recommendation system may be selected from a group consisting of internet website, kiosk, point-of-sale communication and computer software. The communication may be directed at obtaining information related to a particular fishing experience of the angler so as to track the performance of particular fishing products. The communication may be directed at obtaining information related to a particular fishing experience of the angler so as to order new lures to replace lures lost during said experience.

A fishing lure having a leading portion, a trailing portion, a hook and a first connection mechanism. The leading portion may be positioned towards the leading portion of the fishing lure. The trailing portion may be positioned towards the trailing portion of the fishing lure. The hook may be attached to the fishing lure. The first connection mechanism may be adapted to releasably engage the leading portion to the trailing portion.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. None of the drawings are necessarily to scale.

FIG. 1a is a perspective view of a fishing lure in accordance with the present invention;
FIG. 1b is an exploded view of the fishing lure of FIG. 1a;
FIG. 1c is a bottom view of the fishing lure of FIG. 1a;
FIG. 1d is an exploded view of the fishing lure of FIG. 1c;
FIG. 2b is a bottom view of the fishing lure of FIG. 2a;
FIG. 2c is a bottom, exploded view of the fishing lure of FIG. 2a;
FIG. 2d is a right-side elevational, exploded view of the fishing lure of FIG. 2a;
FIG. 2e is a perspective, exploded view of the fishing lure of FIG. 2a;
FIG. 2f is a bottom, perspective exploded view of the fishing lure of FIG. 2a;
FIG. 3a is a top view of another fishing lure in accordance with the present invention;
FIG. 3b is a perspective view of the fishing lure of FIG. 3a;
FIG. 3c is a bottom, exploded view of the fishing lure of FIG. 3a;
FIG. 3d is a perspective, exploded view of the fishing lure of FIG. 3a;
FIG. 3e is a right-side elevational view of the fishing lure of FIG. 3a;
FIG. 3f is a top, perspective view of a lip in accordance with the present invention;
FIG. 3g is a bottom, perspective view of the lip of FIG. 3f;
FIG. 3h is a right-side elevational view of the lip of FIG. 3f;
FIG. 3j is a front elevational view of the lip of FIG. 3f;
FIG. 3k is a top view of the lip of FIG. 3f;
FIG. 3l is a cross-sectional view taken along line A-A within FIG. 3k;
FIG. 3m is a front elevational view of the fishing lure of FIG. 3a with the lip in place;
FIG. 3n is a cross-sectional view taken along line A-A within FIG. 3m;
FIG. 3p is a front elevational view of the fishing lure of FIG. 3a with the lip removed;
FIG. 3q is a cross-sectional view taken along line A-A within FIG. 3p;
FIG. 4a is a perspective view of another fishing lure in accordance with the present invention;
FIG. 4b is a right-side elevational view of the fishing lure of FIG. 4a;
FIG. 4c is a cross-sectional view taken along the longitudinal axis of the fishing lure of FIG. 4b;
FIG. 4d is a close-up view of the circled-region 4710 of the fishing lure of FIG. 4c;
FIG. 5a is a perspective view of a lip in accordance with the present invention;
FIG. 5b is a top view of the lip of FIG. 5a;
FIG. 5c is a cross-sectional view taken along the longitudinal axis of the lip of FIG. 5b;
FIG. 6a is a perspective view of another lip in accordance with the present invention;
FIG. 6b is a top view of the lip of FIG. 6a;
FIG. 6c is a cross-sectional view taken along the longitudinal axis of the lip of FIG. 6b;
FIG. 7a is a perspective view of another lip in accordance with the present invention;
FIG. 7b is a top view of the lip of FIG. 7a;
FIG. 7c is a cross-sectional view taken along the longitudinal axis of the lip of FIG. 7b.

FIG. 13a is a top, exploded view of another fishing lure in accordance with the present invention;

FIG. 13b is a top, exploded view of another fishing lure in accordance with the present invention;

FIG. 13c is a top, exploded view of another fishing lure in accordance with the present invention.

FIG. 14a is a right side, elevational view of another fishing lure in accordance with the present invention;

FIG. 14b is a right side, elevational view of another fishing lure in accordance with the present invention;

FIG. 14c is a right side, elevational view of another fishing lure in accordance with the present invention;

FIG. 15a is a left side, elevational view of another fishing lure in accordance with the present invention having a ball and socket connection mechanism shown in a non-engaged position;

FIG. 15b shows the lure of FIG. 15a in an engaged position;

FIG. 15c shows a top view of a first connection portion suitable for use with the lure of FIG. 15a;

FIG. 15d shows a top view of a first connection portion suitable for use with the lure of FIG. 15a;

FIG. 15e shows a top view of a first connection portion suitable for use with the lure of FIG. 15a;

FIG. 16 is a perspective view of another fishing lure in accordance with the present invention, wherein the lip is in an engaged position;

FIG. 17 is an exploded, perspective view of the fishing lure system of FIG. 16;

FIG. 18a shows the left body portion of FIG. 17;

FIG. 18b shows a close-up view of the left body portion of FIG. 18a to illustrate an exemplary perimeter design that would facilitate a subsequent connection to the right body portion of FIG. 19a by way of an ultrasonic weld;

FIG. 19a shows the right body portion of FIG. 17;

FIG. 19b shows a close-up view of the right body portion of FIG. 19a to illustrate an exemplary perimeter design that would facilitate a subsequent connection to the left body portion of FIG. 18a by way of an ultrasonic weld;

FIG. 20b shows a perspective, right-side view of the lip of FIG. 20a;

FIG. 20c shows a bottom view of the lip of FIG. 20a;

FIG. 20d shows a rear view of the lip of FIG. 20a;

FIG. 20e shows a perspective, left-side view of the lip of FIG. 20a;

FIG. 20f shows an elevational, right-side view of the lip of FIG. 20a;

FIG. 21a shows a bottom view of the fishing lure of FIG. 16 with the lip being removed;

FIG. 21b shows a rear, perspective view of the lip of FIG. 16 that is adapted to be engaged with the fishing lure of FIG. 21a;

FIG. 22a shows a front, elevational view of the fishing lure body and lip of FIG. 16 wherein the lip is being positioned for subsequent engagement into the fishing lure body;

FIG. 22b shows a front, elevational view of the fishing lure body and lip of FIG. 16 wherein the lip has been inserted into the fishing lure body but not yet rotated into a locked position;

FIG. 22c shows a front, elevational view of the fishing lure body and lip of FIG. 16 wherein the lip has been inserted into the fishing lure body and rotated into a locked position;

FIG. 23a shows an elevational, right-side view of the left half body and lip of FIG. 22a;

FIG. 23b shows an elevational, right-side view of the left half body and lip of FIG. 22b;

FIG. 23c shows an elevational, right-side view of the left half body and lip of FIG. 22c;

FIG. 24a shows an close-up view of the left half body and lip of FIG. 23a;

FIG. 24b shows an close-up view of the left half body and lip of FIG. 23b;

FIG. 24c shows an close-up view of the left half body and lip of FIG. 23c;

FIG. 26b shows a perspective view of the lip and gasket of FIG. 26a.

DETAILED DESCRIPTION OF THE INVENTION

FIG. 1a shows a non-limiting, exemplary fishing lure embodiment in accordance with the present invention. More specifically, fishing lure 1000 may comprise of a lip 1100, a leading portion 1200, a body portion 1300, a trailing portion 1400 and at least one hook 1450. Each of said components being directly and/or indirectly engageable in such a way so as to provide a customizable fishing lure. For example, a first connection mechanism 1710 may be provided so as to engage lip 1100 to the leading portion 1200. Similarly, a second connection mechanism 1720 may be used to engage trailing portion 1400 to body portion 1300. As may be appreciated by one skilled in the art, fishing lure 1000 may be constructed in a variety of ways when a variety of said components are provided. FIG. 1b shows an exploded view of fishing lure 1000 from FIG. 1a. As can be seen, first connection mechanism 1710 may comprise of a male connection portion 1710a and a female connection portion 1710b. Similarly, said second connection mechanism 1720 may comprise of a male connection portion 1720*b* and a female connection portion 1720*b*. FIG. 1*c* shows the underneath view of FIG. 1*a* and FIG. 1*d* shows the underneath said of FIG. 1*b*.

Figure 2A:
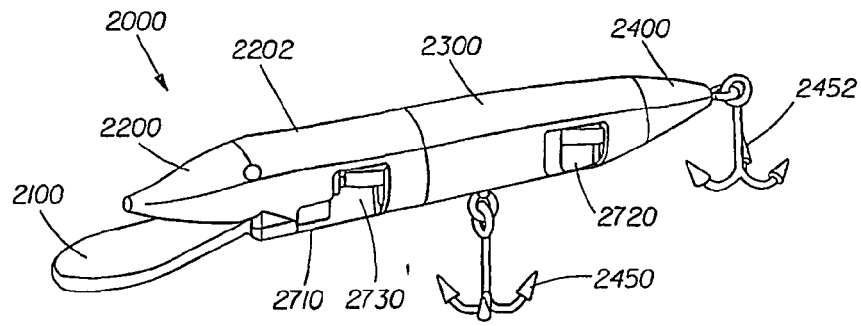
FIG. 2a is a perspective view of another fishing lure in accordance with the present invention.
Figure 2B:
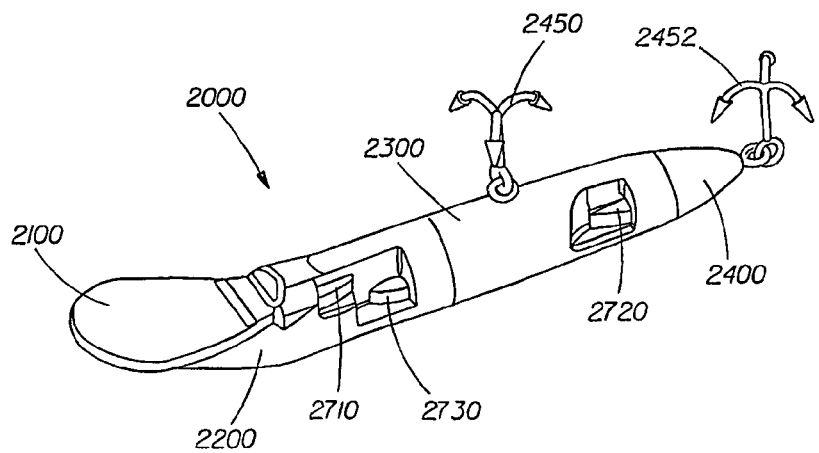

FIG. 2*a* shows another non-limiting, exemplary fishing lure embodiment in accordance with the present invention. More specifically, fishing lure 2000 may comprise of a lip 2100, a leading portion 2200, a body portion 2300, a trailing portion 2400 and at least one hook 2452. Each of said components being directly and/or indirectly engageable in such a way so as to provide a customizable fishing lure. For example, a first connection mechanism 2710 which may allow lip 2100 to be engaged to leading portion 2200, second connection mechanism 2720 may allow body portion 2300 to be engaged to trailing portion 2400 and a third connection mechanism 2730 which may allow leading portion 2200 to be engaged to body portion 2300. Accordingly, fishing lure 2000 provides yet an additional variable (i.e., third connections mechanism 2300) to give the fishing angler additional customizable configurations. Additionally, fishing lure 2000 is shown with an optional second hook 2450 to provide yet another optional configuration. FIG. 2*b* shows an underneath perspective view of fishing lure 2000 from FIG. 2*a*. FIG. 2*c*-2*f* provide exploded views of fishing lure 2000.

FIG. 3*a* shows yet another non-limiting, exemplary fishing lure embodiment in accordance with the present invention. More specifically, fishing lure 3000 may comprise of a lip 3100, a leading portion 3200, a body 3300, and a trailing portion 3400. Each of said components being directly and/or indirectly engageable in such a way so as to provide a customizable fishing lure. Said lip 3100 may comprise a male connection 3710*a* which is adapted to mate with a female connection portion 3710*b*; of course, one skilled in the art would appreciate that obvious variations of such mating connections may be incorporated. In addition, fishing lure 3000 may include a cavity portion 3800 to provide yet additional configuration options for the angler. Said cavity portion may be used to house a variety of elements which will be discussed later in greater detail. FIG. 3*b* shows a perspective view of fishing lure 3000. FIG. 3*c* shows an underneath, perspective view of fishing lure 3000, wherein lip 3100 has not yet been inserted into leading portion 3200. FIG. 3*d* shows an upper, perspective view of fishing lure 3000, wherein lip 3100 is not yet been inserted into leading portion 3200. FIG. 3*d* shows a side elevational view of fishing lure 3000, wherein lip 3100 has been inserted into leading portion 3200.

FIG. 3*f* shows an upper, perspective view of lip 3100. FIG. 3*g* shows an underneath perspective view of lip 3100. FIG. 3*h* shows a right side elevational view of lip 3100. FIG. 3*j* shows a front elevational view of lip 3100. FIG. 3*k* shows a top view of the lip 3100. Said lip 3100 shown having a paddle-shaped design, although a wide variety of designs are contemplated herein. FIG. 3*l* shows a cross-sectional view of lip 3100 from FIG. 3*k*, wherein the male connection portion 3710*a* may be further appreciated by one skilled in the art.

FIG. 3*m* shows a front elevational view of fishing lure 3000 wherein lip 3100 having been inserted into leading portion 3200. FIG. 3*n* shows a cross-sectional view taken a long line A-A of FIG. 3*m*. As can be seen, lip 3100 having a male connection portion 3710*a* may be inserted and releasably engaged to leading portion 3200 and mated with female connection portion 3710*b*. FIG. 3*p* shows a front elevational view of fishing lure 3000 wherein lip 3100 has not yet been inserted. FIG. 3*p* is provided to give further appreciation of the female connection portion 3710*b*. Female connection portion 3710*b* may be further appreciated within cross-sectional view in FIG. 3*q* which is taken along cross-sectional line B-B within FIG. 3*p*.

Figure 4E:
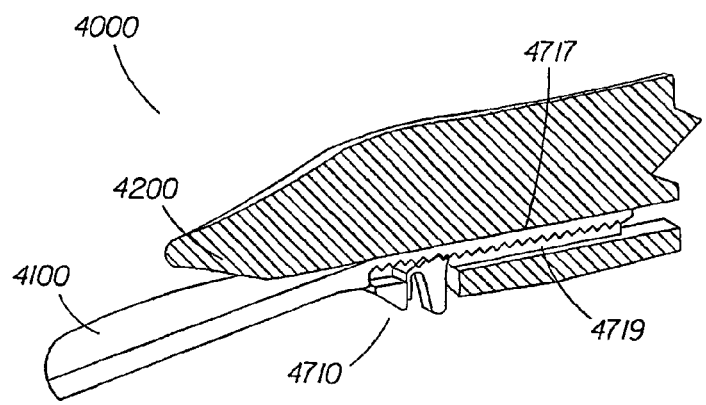
FIG. 4e is a perspective, cross-sectional view taken along the longitudinal axis of the fishing lure of FIG. 4b.
Figure 4F:
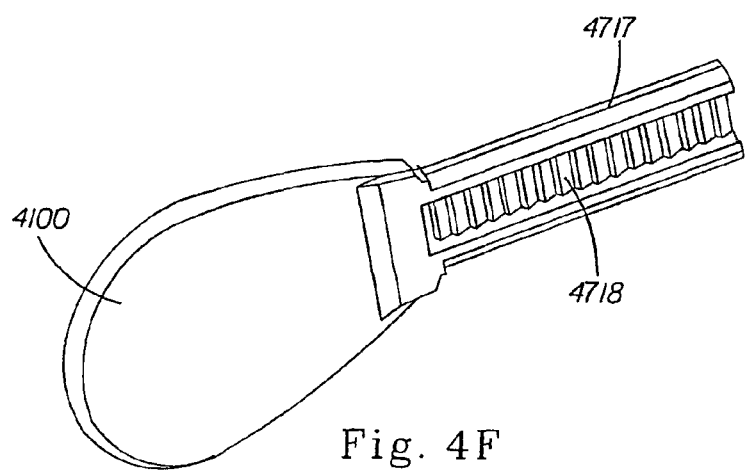
FIG. 4f is a right-side perspective view of the lip within FIG. 4e.

FIG. 4*a* shows yet another non-limiting, exemplary fishing lure embodiment in accordance with the present invention. More specifically, fishing lure 4000 may comprise of a lip 4100, a leading portion 4200, a body portion 4300, and a trailing portion 4400. Each of said components being directly and/or indirectly engageable in such a way so as to provide a customizable fishing lure. Said lip 4100 may be moved inwardly and outwardly from leading portion 4200 in such a manner as to change the amount of surface area exposed externally which may alter the movement properties of lure 4000. For example, the more that said lip 4100 is externally exposed, the deeper that said lure 4000 may dive into the water upon being moved within the water. Of course, one skilled in the art would appreciate that obvious variations of such inward/outward movement may be incorporated. Further, one skilled in the art would appreciate that obvious variations of changing the amount of exposed surface area, pitch or angle may also be incorporated. Accordingly, FIGS. 4*a* and 4*b* show a lever 4712 which may be actuated to cause stop 4714 to engage or disengage a first engaging surface 4717 so as to permit or inhibit the movement of said lip 4100. As can be appreciated in FIGS. 4*c* and 4*d*, the lever mechanism 4710 may include a fulcrum 4713 that permits the actuation of lever 4712. In addition, a second engaging surface 4719 may be include and adapted to engage with said first engaging surface 4717 to provide additional structural integrity and engagement locking. Referring now to FIGS. 4*e* and 4*f*, said first engaging surface 4717 and said second engaging surface 4719 are shown to have mating grooves; however, one skilled in the art would appreciate that obvious variations of mating surfaces may also be incorporated.

Additionally, fishing lure 4000 may also comprise a first connection mechanism 4720 which may be provided so as to engage leading portion 4200 to body portion 4300 and/or a second connection mechanism 4730 which may be provided so as to body portion 4300 to trailing portion 4400. As may be appreciated by one skilled in the art, fishing lure 4000 may be constructed in a variety of ways when a variety of said components are provided.

FIGS. 5*a*-5*c* show a non-limiting, exemplary lip embodiment in accordance with the present invention. More specifically, lip 5000 may comprise of a ruder portion 5100, a locking portion 5710*a*, a reservoir inlet 5990, a reservoir 5994 and a reservoir outlet 5992. Said lip 5000 may be filled with a substance (e.g., fragrant solution) by introduction through reservoir inlet 5990, temporary storage in reservoir 5994 and ultimate dispensing through reservoir outlet 5992 for dissemination into the water for attracting fish. Locking portion 5710*a* may be adapted to engage with the leading portion (or like portion) of the fishing lure. One skilled in the art would appreciate that obvious variations of shape, size, design, engagement, etc. may be incorporated.

FIGS. 6*a*-6*c* show a non-limiting, exemplary lip embodiment in accordance with the present invention. More specifically, lip 6000 may comprise of a ruder portion 6100, a locking portion 6710*a*, a reservoir 6994 and a reservoir elements 6990. Said reservoir 6994 may be occupied with said reservoir elements 6990 so as to provide altering properties of said lip 6000. For example, reservoir elements 6990 may be round weights that are permitted to move about within said reservoir 6994, wherein such movement causes the fishing lure to alter its overall movement. Causing the fishing lure to move in such a manner may result in more life-like movement or minimally in a non-traditional manner that may attract fish. In another example, the inclusion of free moving components (e.g., glass beads, ceramic balls, plastic pellets, etc.) may contact each other and/or the inner walls of cavity 6994 causing the production of sound. This emitted sound can attract fish to the lure. Locking portion 6710a may be adapted to engage with the leading portion (or like portion) of the fishing lure. One skilled in the art would appreciate that obvious variations of shape, size, design, engagement, etc. may be incorporated.

FIGS. 7a-7c show a non-limiting, exemplary lip embodiment in accordance with the present invention. More specifically, lip 7000 may comprise of a ruder portion 7100, a locking portion 7710a, an illumination element 7290, a power source 7294 and a source-to-illumination connection 7292. Said illumination element 7290 may be adapted to provide illumination which is visible to fish and thus attract them. Said power source 7294 may be adapted to be disposable and/or replaceable. Locking portion 7710a may be adapted to engage with the leading portion (or like portion) of the fishing lure. One skilled in the art would appreciate that obvious variations of shape, size, design, engagement, etc. may be incorporated. In addition, one skilled in the art would appreciate that obvious variations of level, color, flashing, continuance, etc. for the illumination may be incorporated.

Figure 7D:
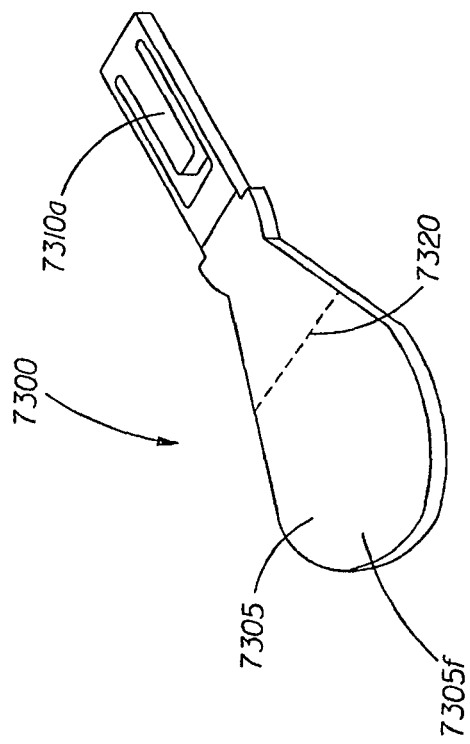
FIG. 7d is a perspective view of another lip in accordance with the present invention.

FIG. 7d shows a non-limiting, exemplary lip embodiment in accordance with the present invention. More specifically, lip 7300 may comprise of a ruder portion 7305, a locking portion 7310a and a fracture section 7320. Locking portion 7310a may be adapted to engage with the leading portion (or like portion) of the fishing lure. Fracture section 7320 may be adapted so as to allow a ruder front portion 7305f of the ruder portion 7305 to be broken away. For example, if the ruder front portion 7305f were to get caught in underwater weeds, excess retraction force (e.g., pulling harder on the fishing rod) may be exerted to cause rude portion 7305 to break along fracture section 7320; thus, ruder front portion 7305f will be left stuck in the weeds while the remainder portion of the fishing lure may be retrieved. Once retrieved, the broken lip may be replaced with a new lip. While this embodiment shows fracture section 7320 is shown as a fracture line, one skilled in the art would appreciate that obvious variations of shape, size, location, etc. may be incorporated.

Figure 7E:
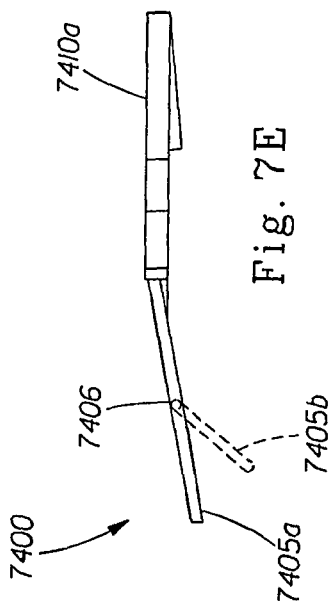
FIG. 7e is a right-side elevational view of another lip in accordance with the present invention.

FIG. 7e shows a non-limiting, exemplary lip embodiment in accordance with the present invention. More specifically, lip 7400 may comprise of a ruder portion 7405, a locking portion 7410a and a pivoting section 7406. Locking portion 7410a may be adapted to engage with the leading portion (or like portion) of the fishing lure. Pivoting section 7406 may be adapted so as to allow a front portion of the ruder portion 7405 to be pivoted, as for example, between ruder portion positions 7405a and 7405b. Such pivoting motion may provide more life-like lure retrieving motions or other desirable motions.

Figure 7F:
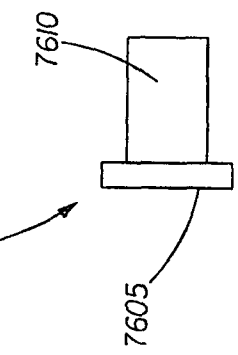
FIG. 7f is a right-side elevational view of another lip in accordance with the present invention.

FIG. 7f shows a non-limiting, exemplary lip embodiment in accordance with the present invention. More specifically, lip 7500 may comprise of a curved ruder portion 7505 and a locking portion 7510. Lip 7500 is provided to illustrate the various shapes and configurations of lips in accordance with the present invention, as appreciated by one skilled in the art.

Figure 7G:
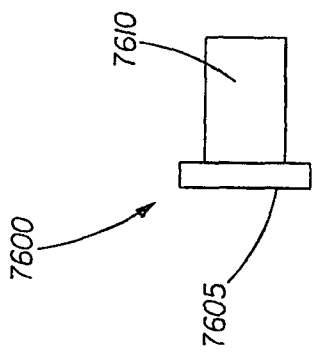
FIG. 7g is a right-side elevational view of another lip in accordance with the present invention.

FIG. 7g shows a non-limiting, exemplary lip embodiment in accordance with the present invention. More specifically, lip 7600 may comprise of a flat portion 7605 and a locking portion 7610. This particular lip 7600 may be used to plug the otherwise opening within the fishing lure in such a way to provide a lip with minimal exposure. When lip 7600 is used to plug said opening, the fishing lure can be retrieved with minimal resistance in the water, thus allowing said lure to raise more towards the top of the water.

Figure 7H:
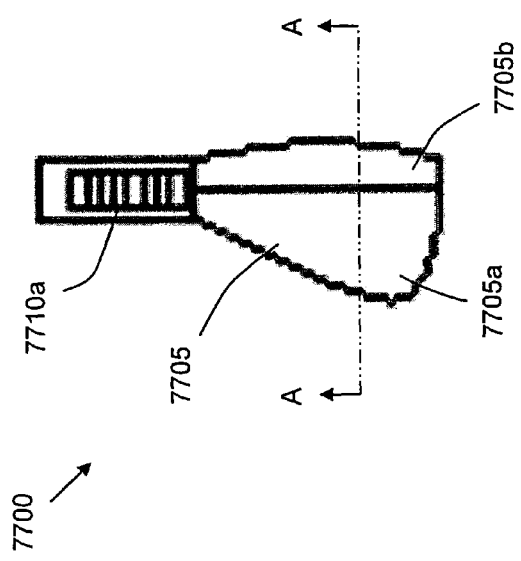
FIG. 7h is a top view of another lip in accordance with the present invention.
Figure 7I:
FIG. 7i is a cross-sectional view taken along line A-A of FIG. 7h.

FIGS. 7h and 7i show a non-limiting, exemplary lip embodiment in accordance with the present invention. More specifically, lip 7700 may comprise a first lip portion 7705a, a second lip portion 7705b and a locking portion 7710a. Lip 7700 is adapted to be retrieved on a non-linear path back to the angler or fishing pole. Such non-linear retrieve may be desirable, for example, when trolling. As can be appreciated from FIG. 7i, which is taken along cross-sectional line A-A within FIG. 7h, the first lip portion 7705a may be tapered to increase drag on its side of lip 7705 as compared to the drag imparted on second lip portion 7705b, thus causing lip 7700 to deflect on an angle when pulled through the water. With the teachings herein, one skilled in the art would appreciate that other lip designs causing differing drag may be used to cause the lure to retrieve in a non-linear manner.

While the above embodiments have illustrated a variety of lip design in accordance with the present invention, one skilled in the art would appreciate additional lip designs which would be in keeping with the teachings of the present invention. For instance, the lips may vary in a variety of physical characteristics which may alter the fishing lure's performance. For example, the lip may be made of a substantially heavy material so as to cause the fishing lure to dive deeply into the water. In another example, the lip may have a particular color(s) to match the desired fishing conditions (e.g., an injured fish; fish spawning, etc.). In another example, the lip may be made to look like other body segments, for example, legs of a frog or transforming tadpole.

Figure 8A:
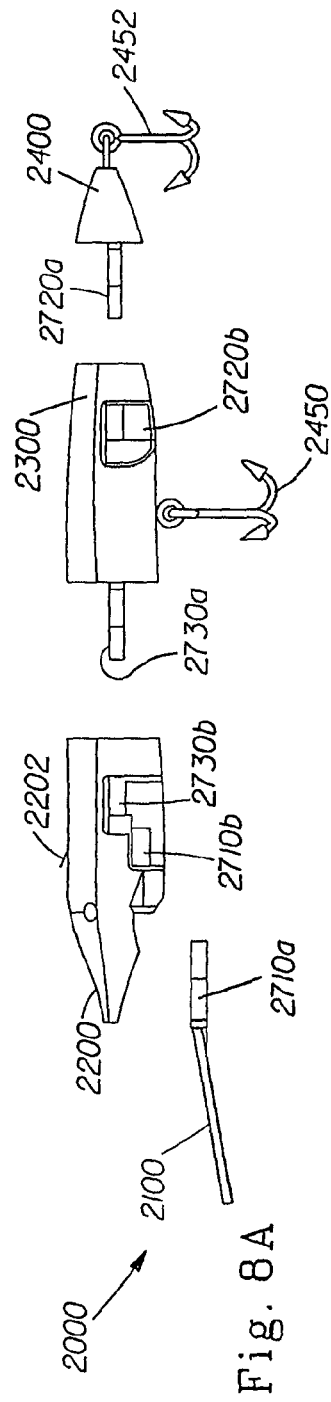
FIG. 8a is a right-side elevational, exploded view of another fishing lure in accordance with the present invention.
Figure 8B:
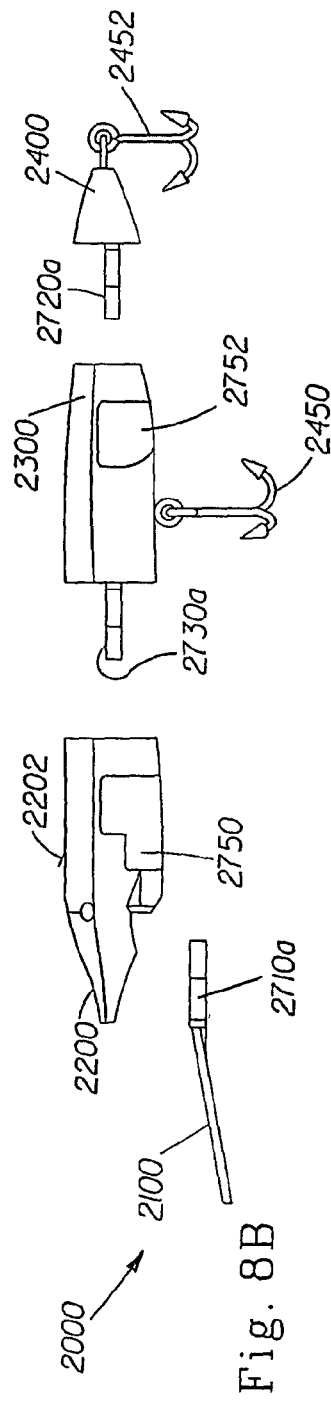
FIG. 8b is a right-side elevational, exploded view of the fishing lure of FIG. 8a having connection covers.

While the above embodiments have been shown to have their connection portions exposed (as exemplified in FIG. 8a), one skilled in the art would appreciate that said connection portions may be substantially covered by connection covers 2750, 2752, as exemplified in FIG. 8b. For example, connection covers 2750, 2752 may be constructed of a thermoplastic elastomer or any like material that has flexible properties. In addition, said connection covers may be made to appear as fish-like features including, but not limited to, gills, scales, injured portions, etc. . . . . . Further, said connection covers may be made to extend beyond the perimeter of the fishing lure so as to appear as fins or the like. Still further, it should be noted that any section of the customizable fishing lure can be produced using molding techniques that incorporate multiple materials of construction. The combination of materials (plastics, rubber, metal, ceramic, etc.) using molding techniques known in the art (insert molding, co-molding, etc.) may allow optimization of the aesthetics, security of part fitment, scent retention, flexibility or optical qualities of the part(s).

Figure 9:
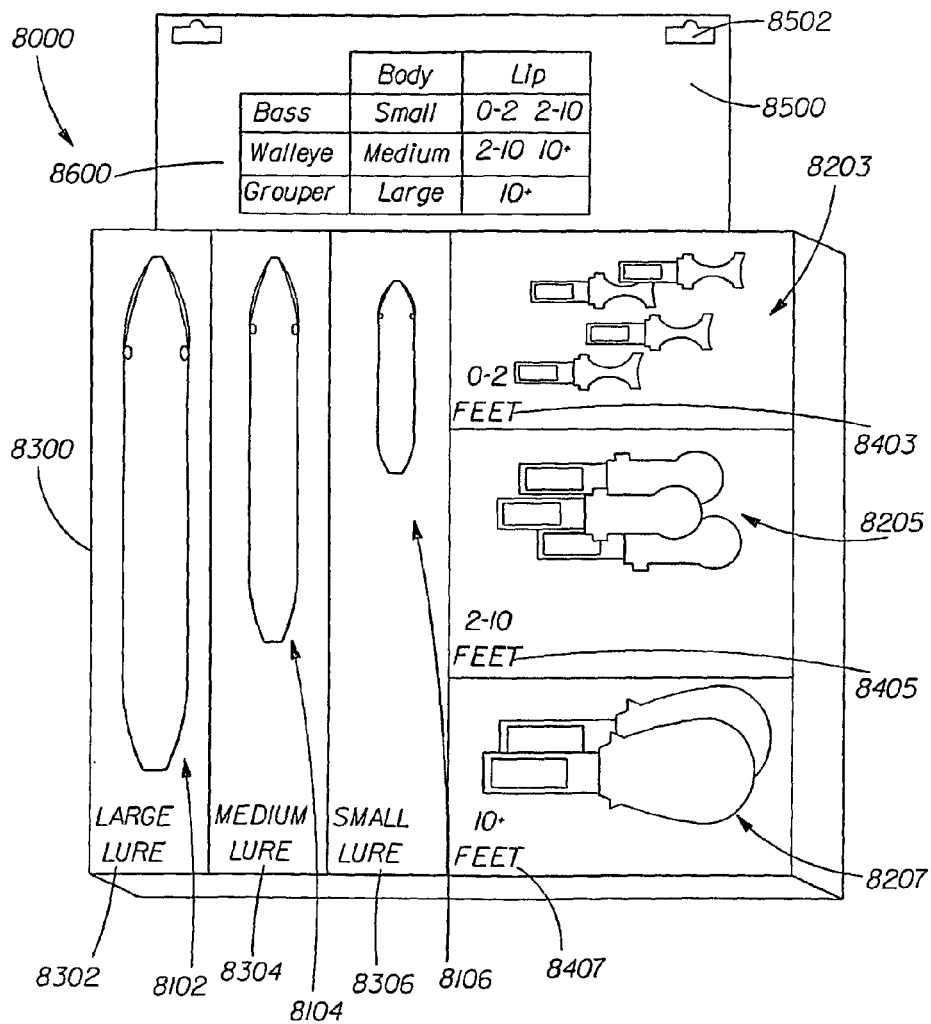
FIG. 9 is a top view of a fishing lure system in accordance with the present invention.

FIG. 9 shows a non-limiting, exemplary fishing lure system embodiment in accordance with the present invention. More specifically, fishing lure system 8000 may comprise of at least one fishing lure 8102, at least one lip 8203 and a package 8300. In addition, fishing lure system 8000 may also comprise a communication 8600 which describes recommendations for combining fishing lures and lips for targeted fishing. FIG. 9 shows a first fishing lure 8102, a second fishing lure 8104 and a third fishing lure 8106, wherein at least one of said lures is different from another. For example, lure 8106 is smaller than 8104 which is smaller than lure 8102. Labels 8302, 8304, 8306 which may be used to emphasis the difference between said lures. Similarly, FIG. 9 shows a first plurality of first lips 8203, a second plurality of second lips 8205 and a third plurality of third lips 8207, wherein at least one of said lips is different from another lip. For example, first lips 8203 are smaller than second lips 8205 which are smaller than third lips 8207. Labels 8403, 8405, 8407 may be used to emphasis the difference between said lips. Lastly, package 8300 may also comprise of a panel 8500 having at least one hole 8502 which permit said package to be displayed on a peg board type display within a retail store.

Figures 10A, 10B:
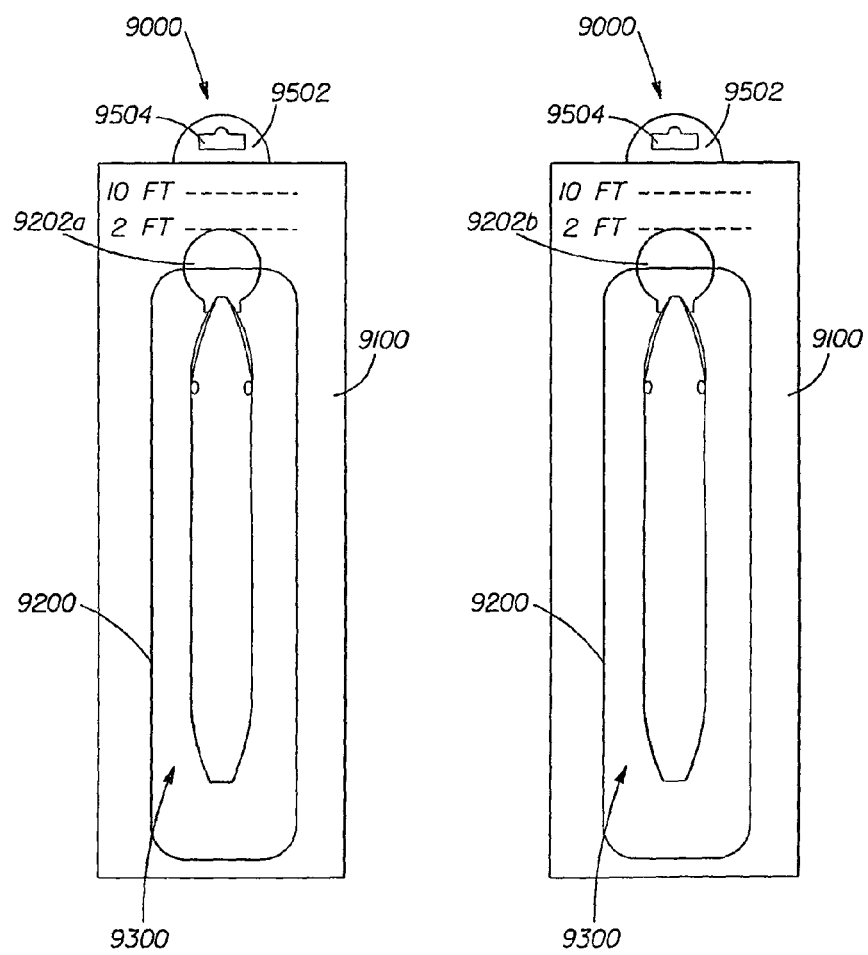
FIG. 10a is a top view of another fishing lure system in accordance with the present invention, wherein the lip is in a retracted position.
FIG. 10b is a top view of the fishing lure system of FIG. 10a, wherein the lip is in an extended position.

FIGS. 10a and 10b show a non-limiting, exemplary fishing lure system embodiment in accordance with the present invention. More specifically, fishing lure system 9000 may comprise a fishing lure 9300 having an extendable lip 9202a, a backpanel 9100 and a package cover 9200. Referring now to FIG. 10a, extendable lip 9202a is shown in a retracted position, wherein the amount of exposed lip surface area is minimized. Referring now to FIG. 10b, extendable lip 9202b is shown in an extended position, wherein the amount of exposed lip surface area is maximized. Fishing lure system 9000 allows the shopping customer to feel and extend the lip prior to purchasing; such a point-of-sale interaction should result in increased sales of said fishing lure systems. Lastly, fishing lure system 9000 may also comprise of a backpanel 9502 having at least one hole 9504 which permits said package to be displayed on a peg board type display within a retail store.

Figure 11:
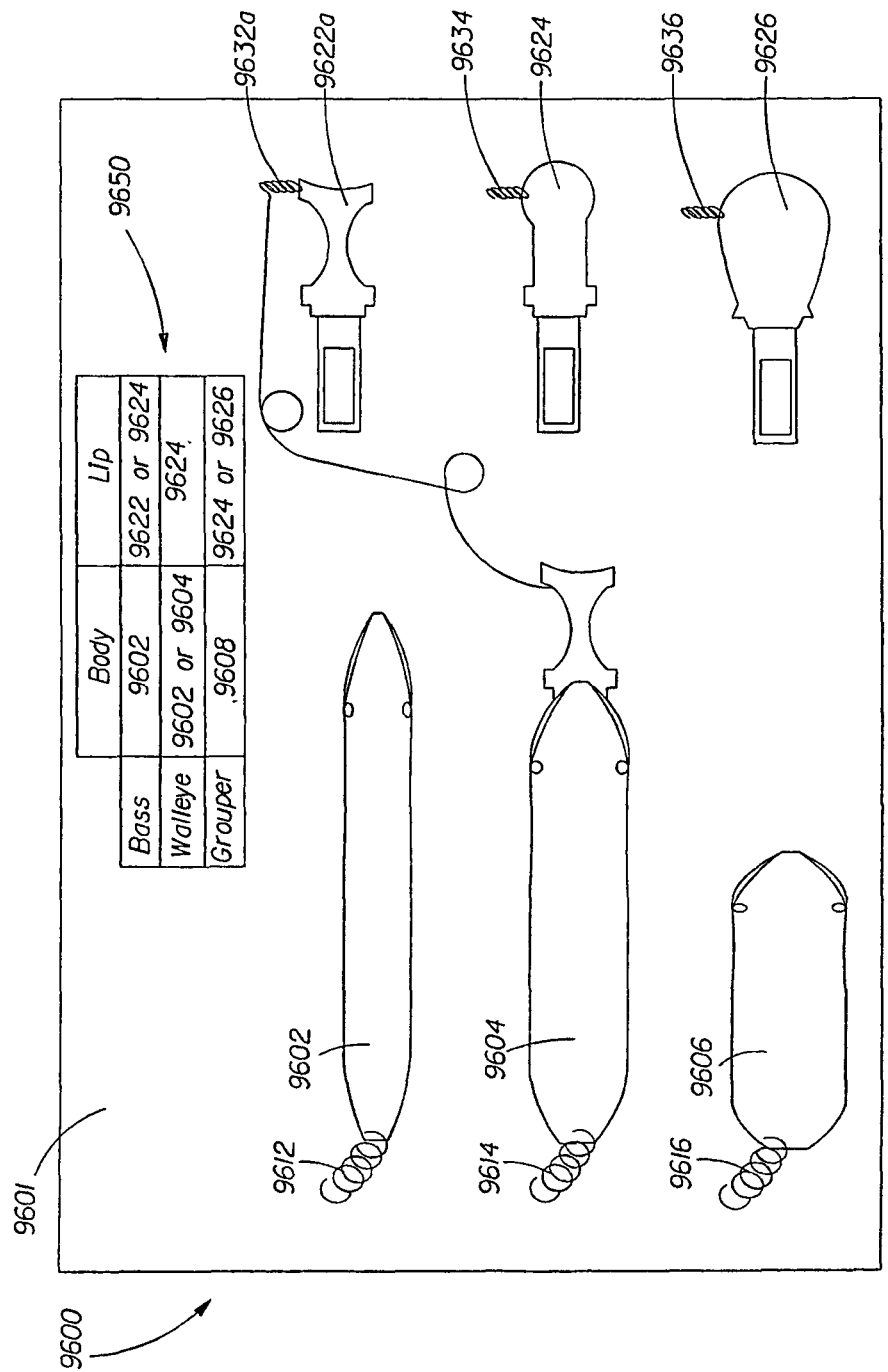
FIG. 11 is a top view of a fishing lure retail display in accordance with the present invention.

FIG. 11 shows a non-limiting, exemplary fishing lure retail display embodiment in accordance with the present invention. More specifically, fishing lure retail display 9600 may comprise at least one fishing lure 9602 having an extendable tether 9612, at least one lip 9622 and a communication 9650 which describes recommendations for combining fishing lures and lips for targeted fishing. FIG. 11 shows a first fishing lure 9602, a second fishing lure 9604 and a third fishing lure 9606, wherein at least one of said lures is different from another. For example, lure 9606 is smaller than 9604 which is fatter than lure 9602. Tethers 9616, 9614, 9612 may be attached to said lures, respectively. Similarly, FIG. 11 shows a first lips 9622, a second lip 9624 and a third lip 9626, wherein at least one of said lips is different from another lip. For example, first lip 9622 is smaller than second lips 9624 which are smaller than third lip 9626. Tethers 9632, 9634, 9634 may be attached to said lips, respectively. As is illustrated, first lip 9622 can be moved from an initial position 9622a to an engaged position 9622b, wherein said tether 9632 can be extended from an initial position 9632a to an engaged position 9632b.

Figure 12A:
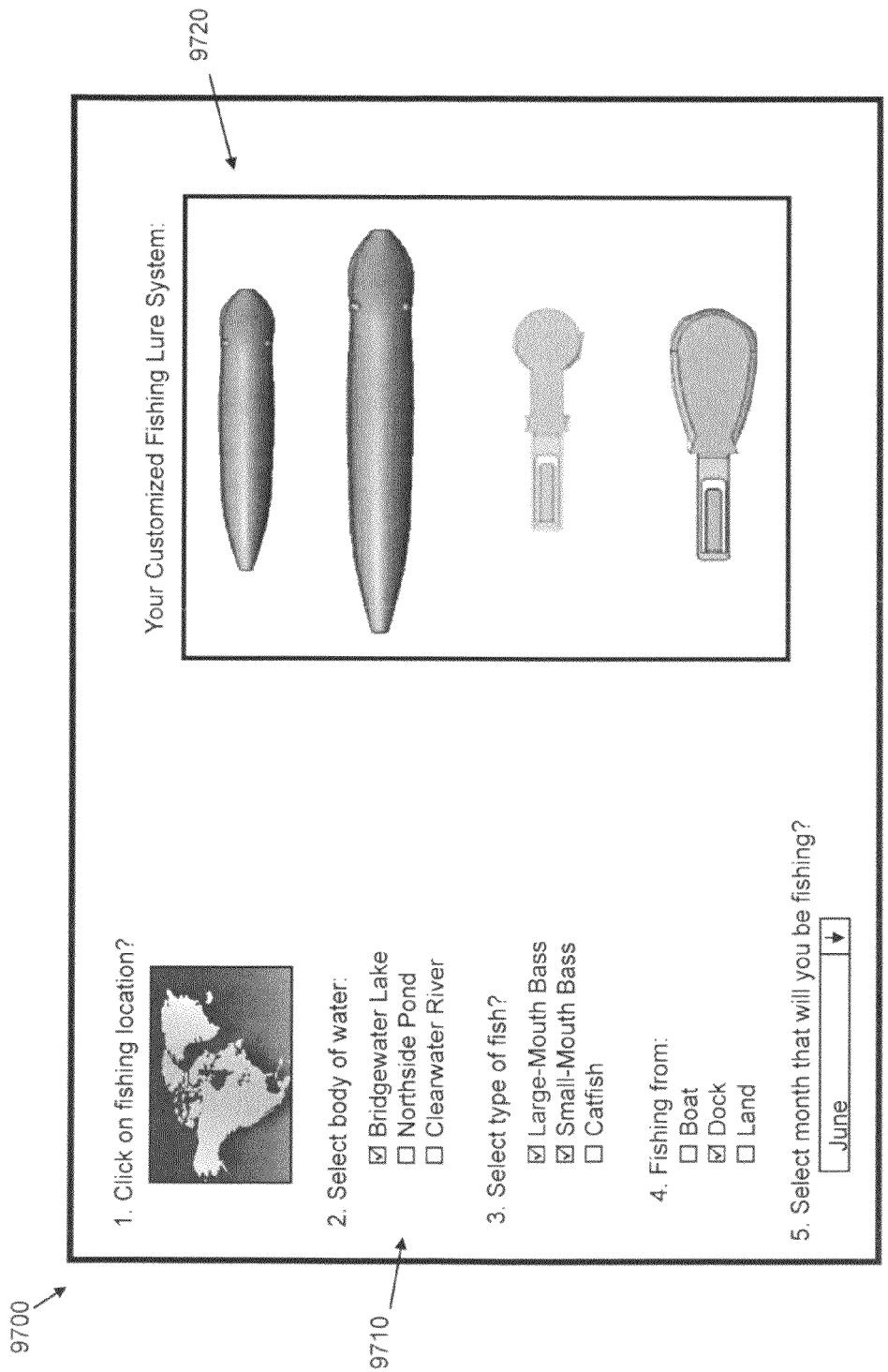
FIG. 12 is a top view of a fishing product recommendation system lure retail display in accordance with the present invention.
Figure 12B:

FIG. 12 shows a non-limiting, exemplary fishing product recommendation system having a user input interface embodiment in accordance with the present invention. More specifically, user input interface 9700 may be take a variety of forms including, but not limited to, an internet website, kiosk, point-of-sale communication and computer software. Said interface 9700 may comprise of a communication 9710 which is directed at acquiring information to assist in a product recommendation 9720 or assistance. For example, communication 9710 may comprise of a variety of questions used to identify the recommend fishing lure system for the desired fishing experience. With said recommendation, the consumer can better select the right fishing lure system within the retail store. Additionally, the consumer may be able to use such interface on the internet and then have the recommend products delivered. Even further, after returning from the fishing trip, the angler can record which lures did better than others so as to track performance. The angler may also indicate which lures were lost so that a new product order may be initiated. With the teachings of this disclosure, one skilled in the art would appreciate other variations directed at achieving the overall result of educations, assisting and selling to the others.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

For example, one skilled in the art would appreciate that many of the disclosed features illustrated within the body of the fishing lure may also be applied to other segments of the lure, as exampled in FIGS. 13a-c. More specifically, FIG. 13a shows the inclusion of rattles in each of the segments. FIG. 13b shows the inclusion of weights in each of the segments. FIG. 13c shows the inclusion of fluorescent materials in each of the segments. Further, if each segment were made via a process that allowed a cavity within the part, a variety of other elements may be utilized including, but not limited to, sound producing mechanisms, light emission, or weight/weight differential mechanisms.

For example, one skilled in the art would appreciate that the segments of the fishing lure may be produced from one or more materials incorporating varying rigidity, flexibility, weight and/or buoyancy. Further, materials that exhibit ecological advantages, such as polylactic acid (PLA) that will biodegrade overtime if lost into the water, may be incorporated. Even further, materials that are made from post consumer recycle substances may be incorporated as such fact is often deemed desirable to the common nature-loving angler.

For example, one skilled in the art would appreciate that the segments may be engaged in a variety of configurations. For example, hooks may be placed on a variety of locations (trailing portion, body, leading portion, etc.). For example, male and female connections may be reversed. Further, other suitable types of connections may be used to engage segments.

For example, one skilled in the art would appreciate that the segments may be of varying sizes, lengths and designs. For example, the lip may be designed to extend beyond the leading portion, extend equal to the leading portion and/or extend short of the leading portion. Fishing lures with such varying lips are often referred to as different types of bait (e.g., poppers having short lips to cause the lure to remain on the surface or "pop" via the trapping of air between an upwardly exposed "cup shaped" lip and the water surface; crank baits having longer lips to cause the lure to dive, etc.). Further, one skilled in the art would appreciate that the benefits of the present invention may be applied to other lures used in fishing; for example, lures commonly referred to as jig or spinner lures. See FIGS. 14a-14c for non-limiting, exemplary embodiments. The lures in FIGS. 14a-14c comprise a leading portion 9802, a trailing portion 9804 and a connection mechanism 9806 which releasably engages said leading portion and said trailing portion. Despite the often different fisherman and/or fishing conditions between traditional crank bait and jigs, the embodiments of the present application demonstrate how the benefits of the present invention may be appreciated in a variety of lure types.

For example, one skilled in the art would appreciate that a variety of connection mechanisms may be used in keeping with the teachings of the present invention. For example, FIGS. 15a-15b show a non-limiting, exemplary embodiment of a fishing lure having a trailing portion and body connection mechanism which allows swivel or pivoting motion during travel through water. More specifically, FIG. 15a shows said embodiment in a pre-engaged position and FIG. 15b shows said embodiment in an engaged position. Said connection mechanism 9811 may be comprised of a first connection portion 9811a and a second connection portion 9811b that are releasably engageable so as to permit engagement and disengagement without the need of a special tool such as a screwdriver or pliers. FIGS. 15c-15e show non-limiting, exemplary embodiments of first connection portions.

FIGS. 16-17 show a non-limiting, exemplary fishing lure embodiment in accordance with the present invention. More specifically, fishing lure 9901 may comprise of a lip 9915, a left body portion 9905, a right body portion 9910 (left and right body portions together being called fishing lure body 9902), a front eyelet 9920 to receive a hook, a mid eyelet 9922 to receive a hook, a rear eyelet 9924 to receive a hook, and an optional rubber gasket 9930. Each of said components being directly and/or indirectly engageable in such a way so as to provide a customizable fishing lure. As may be appreciated by one skilled in the art, fishing lure 9915 may be constructed in a variety of ways when a variety of said components are provided.

FIG. 18*a*-18*b* show the left body portion 9905 with a fin 9906 that facilitates a subsequent connection to ridges 9911 of the right half body 9910 of FIG. 19*a*-19*b* by way of an ultrasonic weld or other like connection technologies.

Figure 20A:
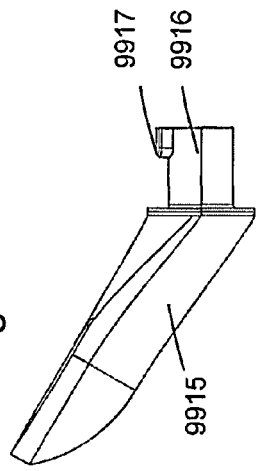
FIG. 20a shows a top view of the lip of FIG. 16.
Figure 20B:
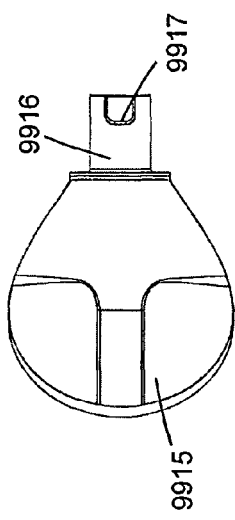
Figure 20F:
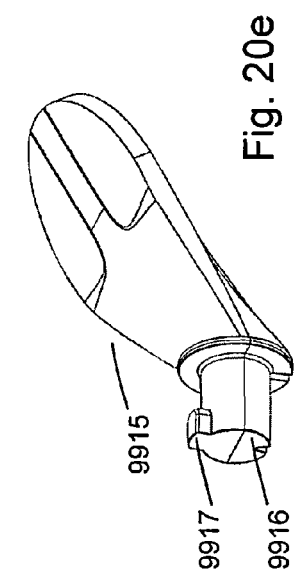
Figure 20E:
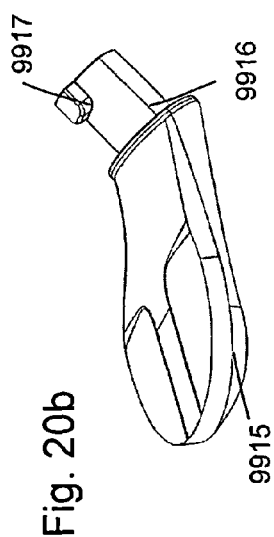
Figure 20D:
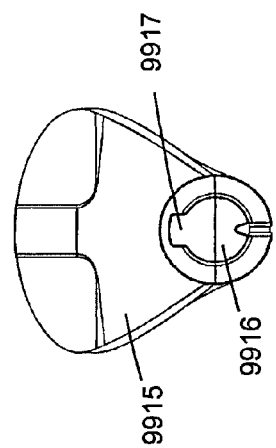
Figure 20C:
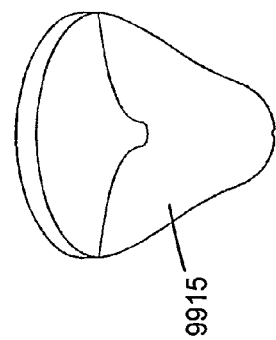

FIG. 20*a* shows a top view of the lip 9915 of FIG. 16. Stem portion 9916 of lip 9915 is adapted to be inserted and rotated inside fishing lure body 9902. The amount of rotation may vary, but it is preferred that the amount of rotation needed to lock lip 9915 into fishing lure body 9902 is no greater than 360 degrees and more preferably no greater than 90 degrees of rotation. Protrusion portion 9917 is adapted to engage and lock lip 9915 into fishing lure 9902. FIG. 20*b* shows a perspective, right-side view of the lip 9915 of FIG. 20*a*. FIG. 20*c* shows a bottom view of the lip 9915 of FIG. 20*a*. FIG. 20*d* shows a rear view of the lip 9915 of FIG. 20*a*. FIG. 20*e* shows a perspective, left-side view of the lip 9915 of FIG. 20*a*. FIG. 20*f* shows an elevational, right-side view of the lip 9915 of FIG. 20*a*. Lip 9915 may be constructed as different sizes and/or weights. A kit could be provided with one or more fishing lure bodies 9902 and multiple lips 9915 wherein said lips have different physical properties (e.g., weights) to provide the user with an array of different customizable lures. Lip 9915 could be made to be porous so as to emit a liquid (not shown; fore example, a scent that attracts fish) from inside the body 9902. Lips 9915 of varying physical characteristics could be distinguished from one another in various ways including, but not limited to, different colors, raised dots for tactile differentiation; surface indicia ("shallow", "mid", "deep").

FIG. 21*a* shows a bottom view of the fishing lure body 9902 of FIG. 16 with the lip 9915 is removed. FIG. 21*b* shows a rear, perspective view of the lip 9915 of FIG. 16 that is adapted to be engaged with the fishing lure 9901 of FIG. 21*a*. FIG. 22*a* shows a front, elevational view of the fishing lure body 9902 and lip of FIG. 16 wherein the lip 9915 is being positioned for subsequent engagement into the fishing lure body 9902. FIG. 22*b* shows a front, elevational view of the fishing lure body 9902 and lip 9915 of FIG. 16 wherein the lip 9915 has been inserted into the fishing lure body 9902 but not yet rotated into a locked position. FIG. 22*c* shows a front, elevational view of the fishing lure body 9902 and lip 9915 of FIG. 16 wherein the lip 9915 has been inserted into the fishing lure body 9902 and rotated into a locked position;

FIG. 23*a* shows an elevational, right-side view of the left half body 9905 and lip 9915 of FIG. 22*a*. FIG. 23*b* shows an elevational, right-side view of the left half body 9905 and lip 9915 of FIG. 22*b*. FIG. 23*c* shows an elevational, right-side view of the left half body 9905 and lip 9915 of FIG. 22*c*. FIG. 24*a* shows an close-up view of the left half body 9905 and lip 9915 of FIG. 23*a* wherein keyway 9940 is adapted to receive, engage and lock lip 9915 into fishing lure body 9902. FIG. 24*b* shows an close-up view of the left half body 9905 and lip 9915 of FIG. 23*b*. FIG. 24*c* shows an close-up view of the left half body 9905 and lip 9915 of FIG. 23*c*.

Figure 25C:
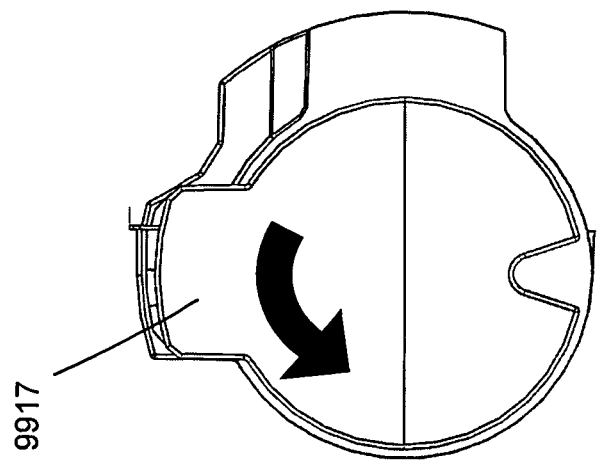
FIG. 25c shows a cut-away view of the left half body and lip of FIG. 24c wherein the lip is inserted and rotated to a locked position.
Figure 25B:
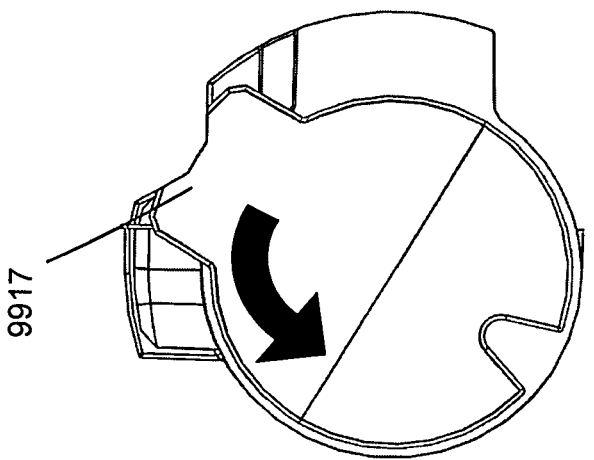
FIG. 25b shows a cut-away view of the left half body and lip of FIG. 24b wherein the lip is inserted and partially rotated to an interference point to provide the user with a signal that the rotation is near its end and about to be locked into place.
Figure 25A:
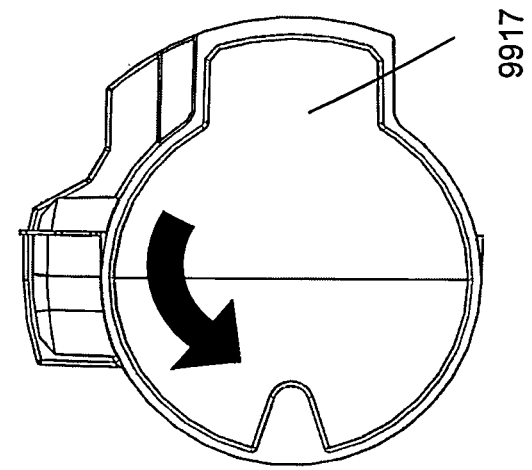
FIG. 25a shows a cut-away view of the left half body and lip of FIG. 24a wherein the lip is inserted but not yet rotated.
Figure 26B:
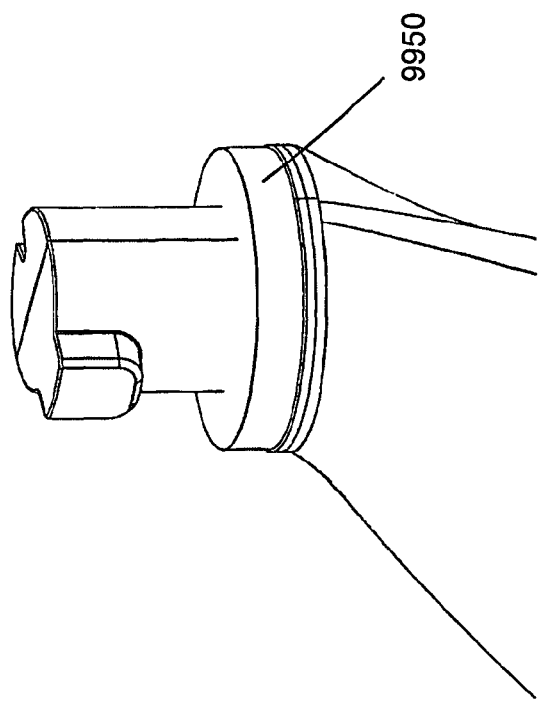
Figure 26A:
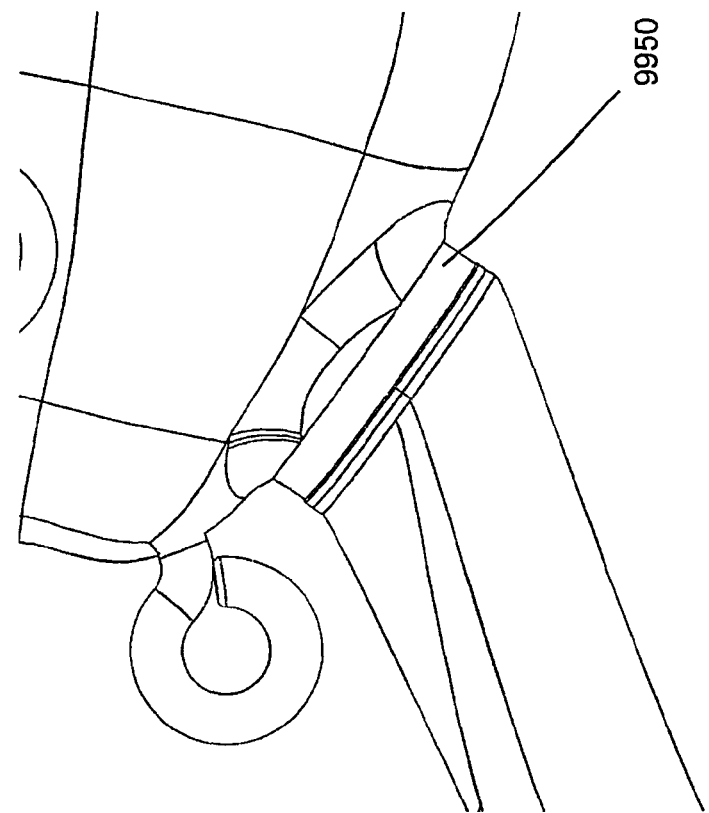
FIG. 26a shows a cut-away view of the left half body and lip of FIG. 24c wherein a gasket is used to further secure the connection between the lip and fishing lure body.

FIG. 25*a* shows a cut-away view of the left half body 9905 and lip 9915 of FIG. 24*a* wherein the lip is inserted but not yet rotated. FIG. 25*b* shows a cut-away view of the left half body 9905 and lip 9915 of FIG. 24*b* wherein the lip 9915 is inserted and partially rotated to an interference point to provide the user with a signal that the rotation is near its completion and nearing to be locked into place. FIG. 25*c* shows a cut-away view of the left half body 9905 and lip 9915 of FIG. 24*c* wherein the lip 9915 is inserted and rotated to a locked position. FIG. 26*a* shows a cut-away view of the left half body 9905 and lip 9915 of FIG. 24*c* wherein a gasket 9950 is used to further secure the connection between the lip and fishing lure body. FIG. 26*b* shows a perspective view of the lip 9915 and gasket 9950 of FIG. 26*a*. Gasket 9950 may be optional used to provide greater resistance for improved force-fit connection of lip 9915 and fishing lure body 9902. Gasket 9950 may be constructed of rubber or any other suitable materials.

Figure 27:
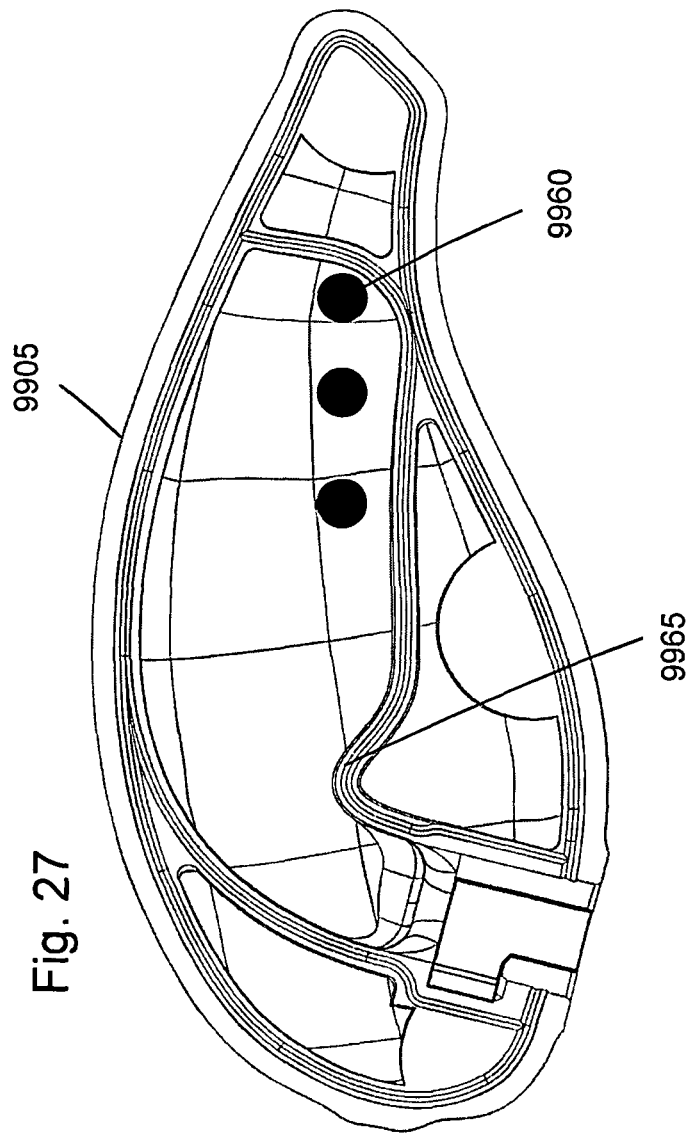
FIG. 27 shows a cut-away view of the left half body shown in FIG. 18a containing a reservoir element.

FIG. 27 shows a cut-away view of the left half body 9905 containing a reservoir element (e.g., ball bearing that may produce a wabble movement for the fishing lure). Left half body 9905 may comprise a raised internal portion 9965 that is adapted to temporarily contain at least one reservoir element 9960 until such time that said lip 9915 can be inserted to permanently contain one or more reservoir element 9960. Reservoir elements may include, but are not limited to, weights, glass beads, ceramic balls, plastic pellets and any combinations thereof.

A significant benefit of the exemplary embodiment depicted in FIG. 16 is that it does not require a squeezing action on the part of the user in order to engage or disengage the lip 9915 from the body 9902. Such squeezing action can be difficult to perform when the lure is wet, weather is cold (especially with gloves) and/or the sunlight is limited, especially when one considers that sharp hooks are part of the lure. Further, this embodiment does not require the lip to be rotated more than 360 degrees which can also be difficult under similar circumstances.

What is claimed is:

1. A fishing lure comprising:
   a lip; said lip being adapted to provide resistance when said fishing lure is moved within water; and
   a body, said body being adapted to attract fish;
   a keyway within said body, said keyway being adapted to receive, engage and lock said lip;
   wherein said lip being adapted to releasably engage with said body without the need of another structural element or hand-tool;
   wherein said lip further comprising a stem portion and a protrusion portion being adapted to releasably engage within said keyway;
   wherein said lip is not capable of being releasably disengaged from said body by merely apply a longitudinal tensile force to said lip;
   wherein said lip is releasably engaged within said keyway by applying a rotational force no greater than 360 degrees.

2. The fishing lure of claim 1 wherein said lip is releasably engaged within said keyway by applying a rotational force no greater than 90 degrees.

3. The fishing lure of claim 1 wherein said body further comprising a reservoir adapted to house at least one reservoir element.

4. The fishing lure of claim 3 wherein said lip provides enclosure of said reservoir to contain said reservoir element.

5. The fishing lure of claim 3 wherein said body comprises a raised internal portion that is adapted to temporarily contain at least one reservoir element until such time that said lip can be inserted to permanently contain said reservoir element.

6. The fishing lure of claim 1 wherein said keyway and said lip together provide for an insertion position, an interference position and a locked position.

7. The fishing lure of claim 1 further comprising a gasket adapted to fit around a stem portion of said lip to provide better fit of said lip to said body.

8. The fishing lure of claim 1 wherein the lure does not require a squeezing action on the part of the user in order to engage or disengage said lip from said body.

\* \* \* \* \*